US011356425B2

(12) United States Patent
Kruger

(10) Patent No.: US 11,356,425 B2
(45) Date of Patent: Jun. 7, 2022

(54) TECHNIQUES FOR IMPROVING SECURITY OF ENCRYPTED VEHICLE SOFTWARE UPDATES

(71) Applicant: PACCAR Inc, Bellevue, WA (US)

(72) Inventor: David R. Kruger, Kent, WA (US)

(73) Assignee: PACCAR Inc, Bellevue, WA (US)

( * ) Notice: Subject to any disclaimer, the term of this patent is extended or adjusted under 35 U.S.C. 154(b) by 94 days.

(21) Appl. No.: 16/206,678

(22) Filed: Nov. 30, 2018

(65) Prior Publication Data

US 2020/0177561 A1 Jun. 4, 2020

(51) Int. Cl.
*H04L 29/06* (2006.01)
*H04L 9/40* (2022.01)
(Continued)

(52) U.S. Cl.
CPC ........ *H04L 63/0435* (2013.01); *H04L 9/0841* (2013.01); *H04L 9/0866* (2013.01);
(Continued)

(58) Field of Classification Search
CPC ... H04L 67/34; H04L 63/0823; H04L 63/061; H04L 9/3234; H04L 9/3268; H04L 9/0863; H04L 9/30; H04L 9/0869; H04L 9/0841; H04L 9/0866; H04L 63/0435; H04L 2209/80; H04L 2209/84; H04W 12/04;
(Continued)

(56) References Cited

U.S. PATENT DOCUMENTS

| 5,278,759 | A | 1/1994 | Berra et al. |
| 5,394,327 | A | 2/1995 | Simon, Jr. et al. |

(Continued)

FOREIGN PATENT DOCUMENTS

| CN | 101080697 B | 4/2010 |
| CN | 202887167 U | 4/2013 |

(Continued)

OTHER PUBLICATIONS

Mahmud et al., "Secure Software Upload in an Intelligent Vehicle via Wireless Communication Links" IEEE Intelligent Vehicles Symposium, Proceedings. 2005. 10.1109/IVS.2005.1505167. pp. 588-593 (Year: 2005).*

(Continued)

*Primary Examiner* — Harunur Rashid
(74) *Attorney, Agent, or Firm* — Merchant & Gould P.C.

(57) ABSTRACT

Embodiments of the present disclosure generally relate to systems, devices, and methods wherein dynamically generated symmetric keys are used for encryption and decryption of software updates for vehicles. The symmetric keys are dynamically generated using a combination of information that ties a given symmetric key to a specific combination of a vehicle and the devices installed therein. The dynamic generation of the symmetric keys also uses a piece of random data generated by an intermediary server, which allows the intermediary server to validate devices before providing the piece of random data and thereby control access to the software updates. Use of the techniques disclosed herein provide heightened security, control, safety, and reliability for over-the-air software updates for vehicles.

9 Claims, 18 Drawing Sheets

(51) Int. Cl.
  *H04L 9/08* (2006.01)
  *H04L 9/30* (2006.01)
  *H04L 9/32* (2006.01)
  *H04W 12/03* (2021.01)
  *G06F 8/65* (2018.01)

(52) U.S. Cl.
  CPC .............. *H04L 9/30* (2013.01); *H04L 9/3234* (2013.01); *H04L 9/3268* (2013.01); *H04W 12/03* (2021.01); *G06F 8/65* (2013.01); *H04L 2209/80* (2013.01); *H04L 2209/84* (2013.01)

(58) Field of Classification Search
  CPC ... H04W 12/03; H04W 12/041; H04W 12/35; G06F 21/606; G06F 21/572; G06F 2221/2115; G06F 8/65
  See application file for complete search history.

(56) References Cited

U.S. PATENT DOCUMENTS

| | | | |
|---|---|---|---|
| 5,442,553 A | 8/1995 | Parillo | |
| 5,490,064 A | 2/1996 | Minowa et al. | |
| 5,896,566 A | 4/1999 | Averbuch et al. | |
| 5,922,037 A | 7/1999 | Potts | |
| 6,181,994 B1 | 1/2001 | Colson et al. | |
| 6,243,627 B1 | 6/2001 | Ozeki | |
| 6,253,122 B1 | 6/2001 | Razavi et al. | |
| 6,370,455 B1 | 4/2002 | Larson et al. | |
| 6,434,455 B1 | 8/2002 | Snow et al. | |
| 6,457,076 B1 | 9/2002 | Cheng et al. | |
| 6,487,717 B1 | 11/2002 | Brunemann et al. | |
| 6,628,233 B2 | 9/2003 | Knockeart et al. | |
| 6,677,854 B2 | 1/2004 | Dix | |
| 6,678,591 B2 | 1/2004 | Ohmura et al. | |
| 6,820,259 B1 | 11/2004 | Kawamata et al. | |
| 6,839,614 B1 | 1/2005 | Timko et al. | |
| 6,954,687 B2 | 10/2005 | Taguchi et al. | |
| 6,965,326 B2 | 11/2005 | Allison | |
| 6,975,612 B1 | 12/2005 | Razavi et al. | |
| 6,978,198 B2 | 12/2005 | Shi | |
| 7,142,962 B1 | 11/2006 | Pflieger et al. | |
| 7,233,814 B2 | 6/2007 | Wissinger et al. | |
| 7,272,475 B2 | 9/2007 | Gawlik et al. | |
| 7,280,900 B2 | 10/2007 | Gault et al. | |
| 7,349,769 B2 | 3/2008 | Hayashi et al. | |
| 7,366,589 B2 | 4/2008 | Habermas | |
| 7,506,309 B2 | 3/2009 | Schaefer | |
| 7,558,603 B2 | 7/2009 | Kadel et al. | |
| 7,623,853 B2 | 11/2009 | Vikse et al. | |
| 8,190,322 B2 | 5/2012 | Lin et al. | |
| 8,311,507 B2 | 11/2012 | Wheatley et al. | |
| 8,336,042 B2 | 12/2012 | Touati et al. | |
| 8,386,589 B2 | 2/2013 | Keefe et al. | |
| 8,498,771 B2 | 7/2013 | Dwan et al. | |
| 8,559,910 B2 | 10/2013 | Yi et al. | |
| 8,655,541 B2 | 2/2014 | You | |
| 8,688,313 B2 | 4/2014 | Margol et al. | |
| 8,713,299 B2 | 4/2014 | Quinn et al. | |
| 8,768,537 B2 | 7/2014 | Kim et al. | |
| 8,875,123 B2 | 10/2014 | Shiba | |
| 8,880,289 B2 | 11/2014 | Uehara | |
| 8,930,067 B1 | 1/2015 | Green et al. | |
| 8,965,627 B2 | 2/2015 | Murakami | |
| 8,972,712 B2 | 3/2015 | Braunberger | |
| 8,996,232 B2 | 3/2015 | Dwan et al. | |
| 9,086,941 B1 | 7/2015 | Siegel | |
| 9,128,798 B2 | 9/2015 | Hoffman et al. | |
| 9,240,081 B2 | 1/2016 | Ko | |
| 9,253,200 B2 | 2/2016 | Schwarz et al. | |
| 9,274,786 B2 | 3/2016 | Ji | |
| 9,361,090 B2 | 6/2016 | Elzein | |
| 9,374,355 B2 | 6/2016 | Schwarz et al. | |
| 9,443,358 B2 | 9/2016 | Breed | |
| 9,464,905 B2 | 10/2016 | Lewis | |
| 9,524,160 B2 | 12/2016 | Takahashi et al. | |
| 9,529,580 B2 | 12/2016 | Vangelov et al. | |
| 9,529,584 B2 | 12/2016 | Eling | |
| 9,557,981 B2 | 1/2017 | Throop et al. | |
| 9,575,743 B1 | 2/2017 | Chun | |
| 9,626,175 B2 | 4/2017 | Davey et al. | |
| 9,672,025 B2 | 6/2017 | Martin et al. | |
| 9,705,990 B2 | 7/2017 | Kresse et al. | |
| 9,720,680 B2 | 8/2017 | Diedrich et al. | |
| 9,722,781 B2 | 8/2017 | Smereka et al. | |
| 2001/0002814 A1 | 6/2001 | Suganuma et al. | |
| 2002/0019877 A1 | 2/2002 | Wrede | |
| 2002/0065698 A1 | 5/2002 | Schick et al. | |
| 2002/0110146 A1 | 8/2002 | Thayer et al. | |
| 2003/0093199 A1 | 5/2003 | Mavreas | |
| 2003/0188303 A1 | 10/2003 | Barman et al. | |
| 2003/0195951 A1 | 10/2003 | Wittel, Jr. et al. | |
| 2003/0232619 A1 | 12/2003 | Fraser | |
| 2004/0111188 A1 | 6/2004 | McClure et al. | |
| 2004/0192189 A1 | 9/2004 | Yuhara et al. | |
| 2004/0214599 A1 | 10/2004 | Ogino | |
| 2005/0090941 A1 | 4/2005 | Stefan et al. | |
| 2005/0160259 A1* | 7/2005 | Ogura | H04L 9/00 713/156 |
| 2005/0187668 A1* | 8/2005 | Baumgarte | G06F 8/60 701/1 |
| 2006/0130033 A1 | 1/2006 | Stoffels et al. | |
| 2009/0138948 A1* | 5/2009 | Calamera | H04L 9/3234 726/6 |
| 2010/0128878 A1* | 5/2010 | Lee | G06F 21/10 380/278 |
| 2011/0320089 A1* | 12/2011 | Lewis | H04W 12/041 701/29.6 |
| 2014/0052330 A1 | 2/2014 | Mitchell et al. | |
| 2014/0059534 A1 | 2/2014 | Daum et al. | |
| 2014/0380296 A1 | 12/2014 | Pal et al. | |
| 2015/0088370 A1 | 3/2015 | Vangelov | |
| 2015/0186548 A1 | 7/2015 | Chun et al. | |
| 2015/0237502 A1* | 8/2015 | Schmidt | H04W 12/08 726/7 |
| 2015/0242198 A1 | 8/2015 | Tobolski et al. | |
| 2015/0331686 A1 | 11/2015 | Petersen et al. | |
| 2015/0363210 A1 | 12/2015 | Wehrman et al. | |
| 2015/0363797 A1 | 12/2015 | Ramesh | |
| 2016/0013934 A1* | 1/2016 | Smereka | G06F 21/572 713/171 |
| 2016/0098266 A1 | 4/2016 | Martin et al. | |
| 2016/0323416 A1 | 11/2016 | Wolf | |
| 2016/0335073 A1 | 11/2016 | Hong | |
| 2016/0371075 A1 | 12/2016 | Moeller et al. | |
| 2016/0371077 A1 | 12/2016 | Moeller et al. | |
| 2017/0039059 A1 | 2/2017 | Gintz et al. | |
| 2017/0046884 A1 | 2/2017 | Liu et al. | |
| 2017/0242678 A1 | 3/2017 | Kurosawa et al. | |
| 2017/0118023 A1 | 4/2017 | Gussen et al. | |
| 2017/0123782 A1 | 5/2017 | Choi | |
| 2017/0180391 A1 | 6/2017 | Hinchliffe et al. | |
| 2017/0075678 A1 | 8/2017 | Sangameswaran et al. | |
| 2017/0242679 A1 | 8/2017 | Sangameswaran et al. | |
| 2017/0295016 A1* | 10/2017 | Revell | H04L 9/0869 |
| 2018/0217828 A1* | 8/2018 | Madrid | H04L 63/0428 |
| 2019/0184916 A1* | 6/2019 | Troia | H04W 4/44 |
| 2020/0153926 A1* | 5/2020 | Slater | G08C 13/00 |

FOREIGN PATENT DOCUMENTS

| | | |
|---|---|---|
| CN | 103136020 A | 6/2013 |
| CN | 103399760 A | 11/2013 |
| CN | 103957244 A | 7/2014 |
| CN | 104090800 A | 10/2014 |
| CN | 104539668 A | 4/2015 |
| CN | 104978205 A | 10/2015 |
| CN | 105094932 A | 11/2015 |
| CN | 105278994 A | 1/2016 |
| CN | 105282250 A | 1/2016 |
| CN | 105468385 A | 4/2016 |
| CN | 105589719 A | 5/2016 |
| CN | 103136001 B | 6/2016 |

(56) References Cited

FOREIGN PATENT DOCUMENTS

| | | |
|---|---|---|
| CN | 105700905 A | 6/2016 |
| CN | 105824653 A | 8/2016 |
| CN | 105978921 A | 9/2016 |
| CN | 106052699 A | 10/2016 |
| CN | 106066800 A | 11/2016 |
| CN | 106383757 A | 2/2017 |
| CN | 106385420 A | 2/2017 |
| CN | 106411967 A | 2/2017 |
| CN | 106506649 A | 3/2017 |
| CN | 106528207 A | 3/2017 |
| CN | 106656565 A | 5/2017 |
| CN | 106850839 A | 6/2017 |
| CN | 106934868 A | 7/2017 |
| DE | 10 2004 052 782 B4 | 12/2007 |
| DE | 10 2007 062 160 A1 | 6/2009 |
| DE | 10 2005 021 103 B4 | 10/2013 |
| DE | 10 2014 221 972 A1 | 5/2016 |
| DE | 10 2015 207 852 A1 | 11/2016 |
| DE | 10 2016 006 701 A1 | 12/2016 |
| DE | 10 2015 219 837 A1 | 4/2017 |
| DE | 10 2004 064 292 B3 | 5/2017 |
| DE | 10 2016 201 279 A1 | 8/2017 |
| EP | 2 041 632 B1 | 5/2012 |
| EP | 2 424 745 B1 | 4/2013 |
| EP | 3 141 974 A1 | 3/2017 |
| EP | 1 324 197 B1 | 4/2017 |
| FR | 2 865 301 B1 | 1/2005 |
| GB | 2536360 A | 9/2016 |
| JP | 2001-67232 A | 3/2001 |
| JP | 2017-149323 A | 8/2017 |
| JP | 6185789 B2 | 8/2017 |
| JP | 2017-157003 A | 9/2017 |
| KR | 10-2001-0027466 A | 4/2001 |
| KR | 100739142 B1 | 7/2007 |
| KR | 100853124 B1 | 8/2008 |
| KR | 101316970 B1 | 10/2013 |
| KR | 10-2014-0086159 A | 7/2014 |
| KR | 10-2014-0105159 A | 9/2014 |
| KR | 10-2015-0144623 A | 12/2015 |
| KR | 101600460 B1 | 3/2016 |
| KR | 10-1619645 B1 | 5/2016 |
| KR | 10-2017-0094765 A | 8/2017 |
| SE | 1051247 A1 | 6/2012 |
| TW | 201537465 A | 10/2015 |
| WO | 98/21077 A1 | 5/1998 |
| WO | 01/71306 A1 | 9/2001 |
| WO | 02/17184 A1 | 2/2002 |
| WO | 03/077205 A2 | 9/2003 |
| WO | 2016/142101 A1 | 9/2016 |
| WO | 2017/010859 A1 | 1/2017 |
| WO | 2017/149824 A1 | 9/2017 |

OTHER PUBLICATIONS

PCT International Search Report and Written Opinion in International Application PCT/US2019/063884, dated Feb. 20, 2020, 8 pages.

* cited by examiner

TECHNIQUES FOR IMPROVING SECURITY OF ENCRYPTED VEHICLE SOFTWARE UPDATES

BACKGROUND

Modern-day vehicles include increasing amounts of software. Software is often essential to the proper functioning of the vehicle. In many cases, software is updated from time to time in order to ensure that the vehicle is operating correctly, and/or to reconfigure vehicle functionality that is only changeable by updating the software. This is true in many types of vehicles, including but not limited to Class 8 trucks, other classes of trucks, farm equipment, buses, and passenger cars.

Electronic control units (ECUs) and other devices associated with the vehicles may store or access updatable software, which may include computer-executable instructions, settings data, torque maps, or other software. ECUs are embedded devices that control electronic systems or subsystems in vehicles. ECUs provide many types of functionality for vehicle operation, including but not limited to engine control, auxiliary equipment control, presentation of information via an instrument panel, and infotainment services. ECUs can be implemented in a variety of hardware configurations. A typical ECU includes a processor (e.g., a microcontroller), memory, input/output lines, and one or more communication links. The memory may include an electronically erasable, programmable, read-only memory ("EEPROM") or other non-volatile memory (e.g., flash memory) and/or random access memory ("RAM") for storing program instructions that are accessible by the processor.

Typically, vehicle software stored on the ECU is updated by coupling a specialized device (sometimes referred to as a flash tool or service tool) to a physical communication port of the vehicle, such as an OBD-II port. Once coupled to the physical communication port, the specialized device transmits the software update to the device to be updated via a vehicle network such as a CAN BUS or another type of network, and the device is updated. In order to apply the software update using this approach, the vehicle must be taken to a dealership, service center, or other location that offers software update services using the specialized device. Dealerships and service centers where such updates can be installed may not always be closely available to the vehicle, and application of the updates may take an inconvenient amount of time. For example, during a trip, a vehicle requiring such a software update may need to change its route, resulting in a change in itinerary and a possible delay in the installation of critical updates.

To address these limitations, over-the-air updates have been introduced in which vehicle software on the ECU can be updated wirelessly, without physically connecting the vehicle to a specialized device. In some embodiments, over-the-air updates can be delivered to the vehicle from an update server via a wireless network. The wireless network may be a private wireless network such as a protected Wi-Fi network, or could be a public network such as a 3G network, a 4G network, an LTE network, or any other wireless network, including the Internet. Such embodiments address many of the drawbacks of using a specialized device to update the vehicle software, because the vehicle can be updated at any location in which the vehicle can wirelessly access a network through which it can reach the update server.

Though over-the-air updates do address some of the problems with using a specialized device to provide vehicle software updates, technical problems exist in implementing over-the-air update systems. For example, using a public network to deliver and/or otherwise manage software updates to a vehicle opens a vector of attack through which an unauthorized actor could attempt to install unapproved, malicious, or otherwise unwanted software updates. As such, ensuring the integrity of the software update to be applied to the vehicle is a significant technical problem. As another example, allowing software updates to occur outside of a dealership or service center means that the person initiating the software update may not be fully trained or experienced in applying software updates the way a technician in a dealership or service center is, and may inadvertently attempt to apply a given software update to a vehicle for which it was not intended, or for a vehicle which has been reconfigured since the generation of the software update. This introduces an additional technical problem, in that the safety and reliability of applying an over-the-air software update is reduced compared to previous techniques that were only performed by skilled technicians.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of encrypting a software package to be delivered to an over-the-air updater device of a given vehicle is provided. A packaging server retrieves, from a communication gateway server, information for generating a symmetric key associated with the given vehicle. The packaging server generates the symmetric key based on the information for generating the symmetric key associated with the given vehicle retrieved from the communication gateway server. The packaging server encrypts the software package using the symmetric key. The packaging server transmits the encrypted software package for delivery to the over-the-air updater device of the given vehicle.

In some embodiments, a vehicle comprising at least one non-transitory computer-readable medium having software stored thereon and an over-the-air (OTA) updater device is provided. The OTA updater device comprises at least one processor and a non-transitory computer-readable medium having computer-executable instructions stored thereon. The instructions, in response to execution by the at least one processor, cause the OTA updater device to perform actions comprising: receiving, from a communication gateway server, a validation token; receiving an encrypted software update package for updating the software stored on the at least one non-transitory computer-readable medium of the vehicle; signing the validation token using a private key associated with the OTA updater device; transmitting, to the communication gateway server, the signed validation token; in response to verification of the signed validation token by the communication gateway server, receiving, from the communication gateway server, a random key associated with the encrypted software update package; generating a symmetric key based on at least the random key; and decrypting the software update package using the symmetric key.

In some embodiments, a non-transitory computer-readable medium having computer-executable instructions stored thereon is provided. The instructions, in response to execution by one or more processors of a computing device, cause the computing device to perform actions for verifying an over-the-air (OTA) updater device of a vehicle and sharing information for generating a symmetric encryption key. The actions comprise generating a random key to be associated with the OTA updater device; storing the random key; transmitting the random key to a packaging server for use by the packaging server in generating a symmetric key; and transmitting the random key to the OTA updater device for use by the OTA updater device in generating the symmetric key.

DESCRIPTION OF THE DRAWINGS

Non-limiting and non-exhaustive embodiments of the present disclosure are described with reference to the following figures, wherein.

DETAILED DESCRIPTION

Figure 1:
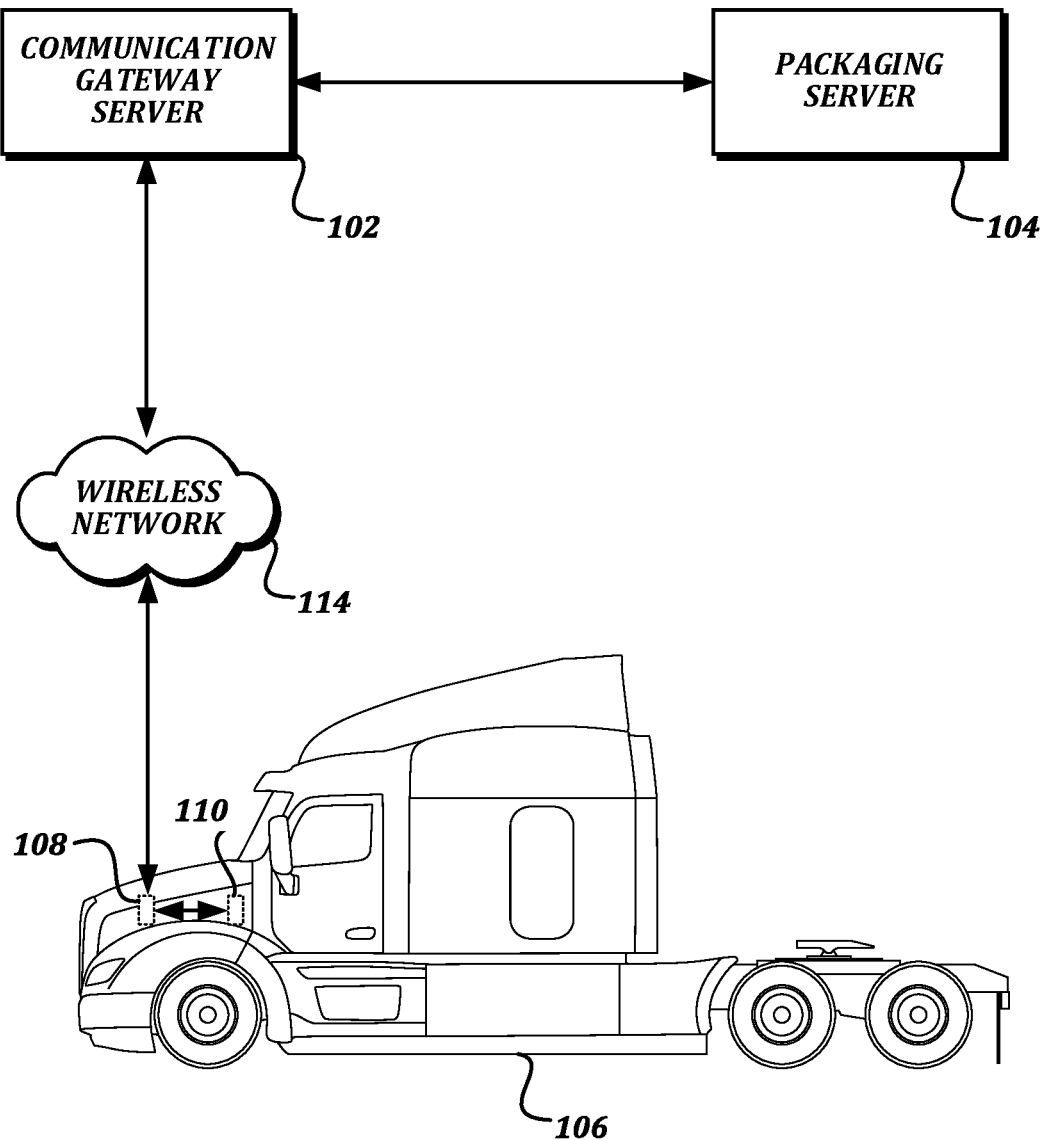
FIG. 1 is a schematic diagram of an example embodiment of an environment in which over-the-air software updates for components of a vehicle are performed according to one or more aspects of the present disclosure.

While encrypting the software update at a trusted server and decrypting the software update at the vehicle can help address some of the vulnerability of tampering occurring while the software update is being transmitted to the vehicle, not all of the problems can be addressed by simply applying traditional encryption techniques. For example, if static encryption keys are used to encrypt and decrypt the software update, the system is vulnerable to being rendered entirely insecure if the static keys were ever to be made publicly available. Dynamic encryption keys can provide greater security, but the problem would remain of how such keys can be distributed to vehicles without using undesirable, inefficient asymmetric encryption techniques for key exchange. This is a particular problem when an intermediary server operated by a third party is used to manage communication between the vehicles and a source of the encrypted software updates. It is likely that the intermediary server, which may provide wireless network coverage and connectivity for vehicles across a large geographical area, may be provided by a party that is more closely related to the networking and/or wireless communication industries, versus the trusted server, which is likely to be provided by a party that is more closely related to the manufacture, maintenance, or operation of the vehicle. Accordingly, the intermediary server may not be under control of the same party as the encrypted software updates, and therefore may not be fully trusted to have access to the symmetric keys.

As will be described in more detail below, embodiments of the present disclosure generally relate to systems, devices, and methods wherein dynamically generated symmetric keys are used for encryption and decryption of software updates for vehicles. The symmetric keys are dynamically generated using a combination of information that ties a given symmetric key to a specific combination of a vehicle and the devices installed therein. The dynamic generation of the symmetric keys also uses random data generated by an intermediary server.

Embodiments of the present disclosure address the technical problems discussed above in multiple ways. In order to recreate a given symmetric key, a party must have access to all of the information used to generate the symmetric key, as well as access to the specific derivation logic used to process the pieces of information to generate the symmetric key. Because information that identifies the vehicle and information that identifies the devices installed therein (such as a device serial number of an OTA updater device 108, a device serial number of an updatable component 110, or an ICCID of a SIM used by the OTA updater device 108) are used to generate the symmetric key, the symmetric key can only be generated by the OTA updater device 108 installed in the vehicle that is the intended target of the software update, because only the OTA updater device 108 installed in the intended target vehicle will have access to all of the information that identifies the devices installed in the vehicle. This helps solve the problems of safety and reliability caused by using less-skilled users to install the software updates, because it will not be possible to decrypt and install the software update on a vehicle other than the intended target vehicle. Accordingly, inadvertent installation of the wrong software is eliminated using this approach.

This approach also solves another problem of unauthorized access, because each device (e.g., the OTA updater device 108 described below) used to decrypt a software update is only capable of decrypting the update encrypted for that particular vehicle while installed in that particular vehicle. Accordingly, an OTA updater device used to successfully decrypt a given software update for a first vehicle while installed in the first vehicle would not be able to decrypt and install the given software update as encrypted for the first vehicle while installed in a second vehicle, because a device identifier and/or a vehicle identification number (VIN) needed for generating the symmetric key and read by the OTA updater device from the second vehicle to generate the symmetric key will be different on the second vehicle than on the first vehicle.

The use of an intermediary server also helps improve the security of the system, because the intermediary server can control what devices receive the random data based on verification of devices requesting the piece of random data. Further, because the specific derivation logic is not known to the intermediary server, the encrypted software updates are protected from tampering even by the intermediary server, which improves security in cases where the intermediary server is not fully trusted by the party that is creating and distributing the vehicle updates.

FIG. 1 is a schematic diagram of an example embodiment of an environment in which over-the-air software updates for components of a vehicle are performed according to one or more aspects of the present disclosure. The term "over-the-air" refers in general to communication with the vehicle 106 via one or more wireless networks instead of via a physical connection between the vehicle 106 and an update device. Accordingly, over-the-air updates of a vehicle 106 can be performed at any location where the vehicle 106 has a communication link to the one or more wireless networks, without requiring the vehicle 106 to be located at a dealership or service center. As shown, the environment 100 includes a vehicle 106, a packaging server 104, and a communication gateway server 102.

The vehicle 106 includes an over-the-air updater device 108 and one or more updatable components 110. The over-the-air updater device 108 communicates with the communication gateway server 102 via a wireless network 114. The wireless network 114 may include one or more types of wireless communication technology, including but not limited to a 2G wireless network, a 3G wireless network, a 4G wireless network, an LTE wireless network, a Wi-MAX wireless network, a Wi-Fi wireless network, a satellite-based wireless network, or any suitable network capable of wirelessly transmitting software updates. In some embodiments, some portions of the wireless network 114, such as a portion of the wireless network 114 that is coupled to the communication gateway server 102, may include wired communication technology including but not limited to an Ethernet local-area network or the Internet. Even in such embodiments, the connection between the vehicle 106 and the wireless network 114 will be via a portion of the wireless network 114 that includes a wireless communication technology.

The communication gateway server 102 is typically present in a different location than then packaging server 104. Accordingly, the communication gateway server 102 and the packaging server 104 communicate via any suitable wired or wireless networking technology, including but not limited to Ethernet and the Internet. In some embodiments, the communication between the communication gateway server 102 and the packaging server 104 may be encrypted using TLS, SSL, or any other cryptographic protocol for protecting the communication between the communication gateway server 102 and the packaging server 104 from eavesdropping. Likewise, in some embodiments, the communication between the communication gateway server 102 and the OTA updater device 108 may be encrypted using TLS, SSL, or any other cryptographic protocol for protecting the communication from eavesdropping. In some embodiments, encryption of the communication between the communication gateway server 102 and the OTA updater device 108, or between the communication gateway server 102 and the packaging server 104, may not be encrypted, and the division of information between various devices and the confidentiality of the derivations may be relied upon to provide adequate security for the software updates.

Figure 2A:
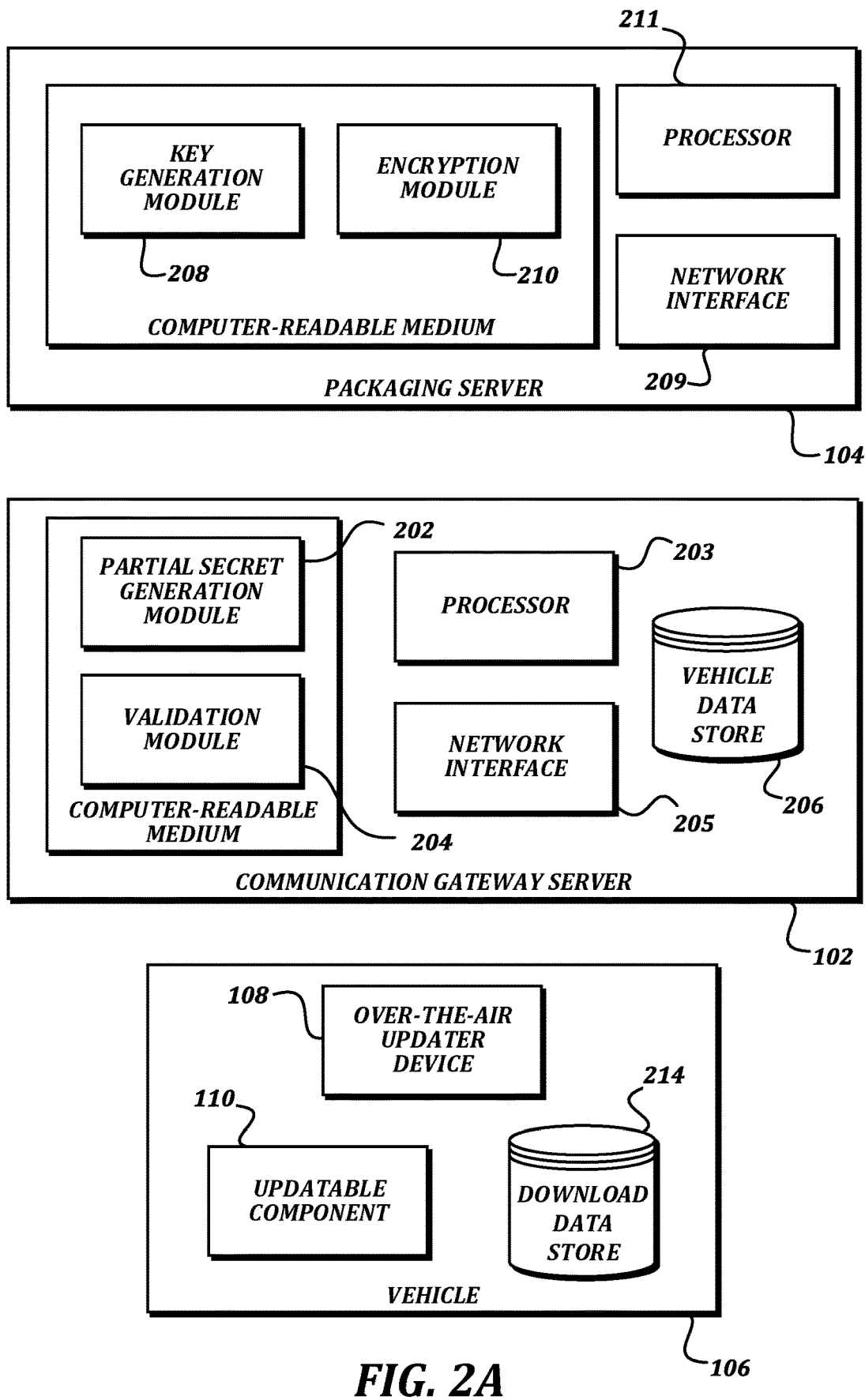
FIGS. 2A and 2B are block diagrams that illustrate details of various components of the environment illustrated in FIG. 1 according to one or more aspects of the present disclosure.
Figure 2B:
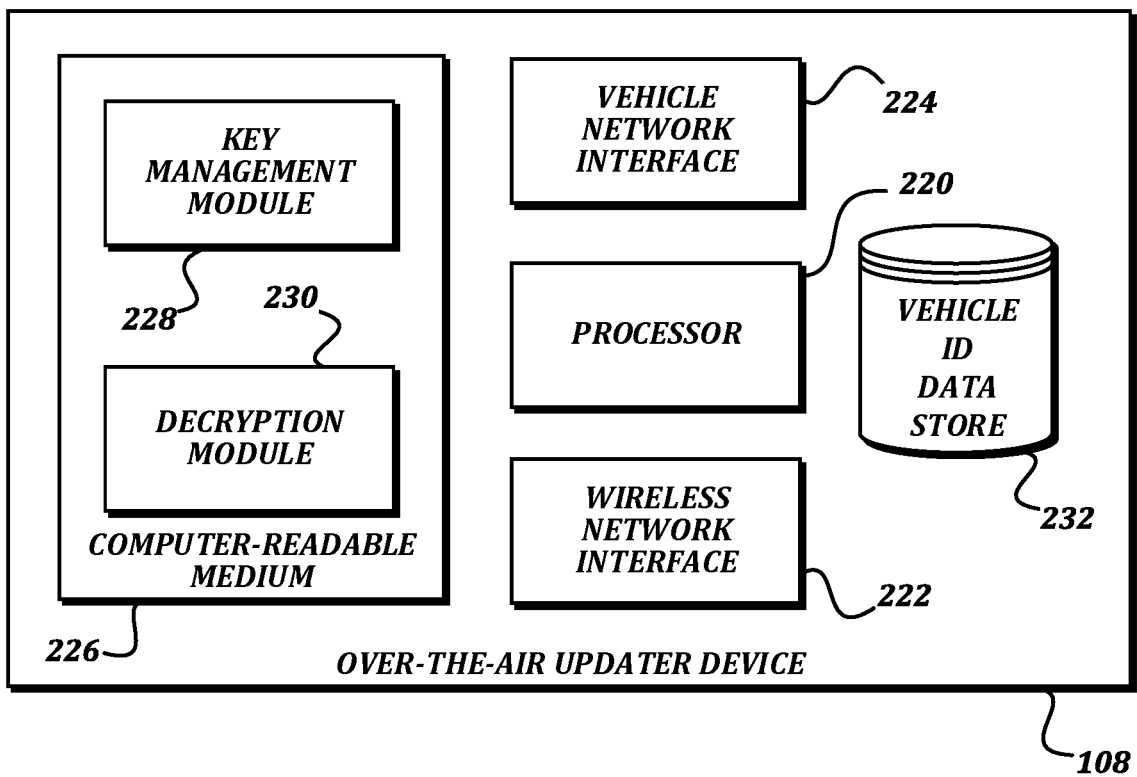

FIGS. 2A and 2B are block diagrams that illustrate details of various components of the environment illustrated in FIG. 1 according to one or more aspects of the present disclosure. As shown in FIG. 2A (and as previously shown in FIG. 1), the environment includes a packaging server 104, a communication gateway server 102, and a vehicle 106.

In some embodiments, the packaging server 104 includes one or more computing devices capable of communicating with the communication gateway server 102 and performing the actions described below. Any suitable computing devices may be used. Typically, the computing devices of the packaging server 104 may include desktop computing devices, server computing devices, rack-mounted computing devices, and/or cloud computing systems. In some embodiments, the computing devices of the packaging server 104 are hosted in a single data center. In some embodiments, the computing devices of the packaging server 104 are located in more than one data center, and communicate with each other via one or more networks.

As shown, the packaging server 104 includes a computer-readable medium 213 that stores a key generation module 208 and an encryption module 210, one or more processors 211, and one or more network interfaces 209. In some embodiments, the key generation module 208 may obtain information for generating symmetric keys, and may generate the symmetric keys using the obtained information. In some embodiments, the key generation module 208 may also generate a set of metadata to accompany a given software update that can be used, along with other information not included in the set of metadata, while regenerating the symmetric key for decrypting the software update. In some embodiments, the encryption module 210 may use the symmetric keys generated by the key generation module 208 to encrypt software updates.

In general, the word "module," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, Swift, Go, and/or the like. A module may be compiled into executable programs or written in interpreted programming languages. Software modules may be callable from other modules or from themselves. Generally, the modules described herein refer to logical modules that can be merged with other modules, or can be divided into modules. As a non-limiting example, in some embodiments, the user processing module 208 and the communication relay module 210 may be combined into a single module. The modules can be stored in any type of computer-readable medium or computer storage device and be stored on and executed by one or more processors of an ECU or other computing device, thus creating a special purpose computer configured to provide the module. Thus, the term "module" as used herein may be shorthand for one or more processors and a computer-readable medium having computer-executable instructions stored thereon that, in response to execution by the one or more processors, cause the one or more processors to perform the actions described as being performed by the module.

In some embodiments, the one or more processors 211 may include any suitable processor, including but not limited to a general purpose CPU, a graphics processor, and other types of processors. The one or more processors 211 execute computer-executable instructions stored on the computer readable medium 213. In some embodiments, the one or more network interfaces 209 may include a wired interface including but not limited to an Ethernet interface, a USB interface, a FireWire interface, or other type of wired interface. In some embodiments, the one or more network interfaces 209 may include a wireless interface including but not limited to a Wi-Fi interface, a 3G interface, a 4G interface, an LTE interface, a Bluetooth interface, or another type of wireless interface.

The packaging server 104 is illustrated in a single box, and in some embodiments, may be implemented using a single computing device. In some embodiments, multiple computing devices may be used to provide the packaging server 104. In such embodiments, the components of the packaging server 104 illustrated in FIG. 2A may be duplicated amongst the computing devices and load may be balanced between the computing devices, or some components may be present on some computing devices and some components may be present on other computing devices. For example, a first computing device (or set of computing devices) may provide the key generation module 208, while a second computing device (or set of computing devices) provides the encryption module 210. In some embodiments, at least some components of the packaging server 104 may be provided in a cloud service or using a virtual server instead of being provided by a dedicated computing device.

As shown, the communication gateway server 102 includes a computer-readable medium 201 that stores a partial secret generation module 202 and a validation module 204, one or more processors 203, one or more network interfaces 205, and a vehicle data store 206. In some embodiments, the partial secret generation module 202 may register OTA updater devices 108 for use in the environment 100, and may use the information collected during registration to generate partial secret information. In some embodiments, the validation module 204 may generate validation tokens to be transmitted to OTA updater devices 108. In some embodiments, the validation module 204 may also validate signed validation tokens returned to the communication gateway server 102 by the OTA updater devices 108 in order to validate the identity of the OTA updater devices 108.

In some embodiments, the vehicle data store 206 stores information collected from OTA updater devices 108 during registration. The vehicle data store 206 may also store partial secret information and/or validation information associated with a given OTA updater device 108 or vehicle 106 for later use. A "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner, such as files in a file system, on a computer-readable storage medium, as described further below.

In some embodiments, the one or more processors 203 may include any suitable processor, including but not limited to a general purpose CPU, a graphics processor, and other types of processors. The one or more processors 203 execute computer-executable instructions stored on the computer readable medium 201. In some embodiments, the one or more network interfaces 205 may include a wired interface including but not limited to an Ethernet interface, a USB interface, a FireWire interface, or other type of wired interface. In some embodiments, the one or more network interfaces 205 may include a wireless interface including but not limited to a Wi-Fi interface, a 3G interface, a 4G interface, an LTE interface, a Bluetooth interface, or another type of wireless interface.

The communication gateway server 102 is illustrated in a single box, and in some embodiments, may be implemented using a single computing device. In some embodiments, multiple computing devices may be used to provide the communication gateway server 102. In such embodiments, the components of the communication gateway server 102 illustrated in FIG. 2A may be duplicated amongst the computing devices and load may be balanced between the computing devices, or some components may be present on some computing devices and some components may be present on other computing devices. For example, a first computing device (or set of computing devices) may provide the partial secret generation module 202, while a second computing device (or set of computing devices) provides the validation module 204, and a third computing device (or set of computing devices) provides the vehicle data store 206. In some embodiments, at least some components of the communication gateway server 102 may be provided in a cloud service or using a virtual server instead of being provided by a dedicated computing device.

As stated above, the vehicle 106 may be any type of vehicle that includes updatable software. In some embodiments, the vehicle 106 is a Class 8 truck. In some embodiments, the vehicle 106 is another type of vehicle, such as another class of truck, a bus, a passenger car, a motorcycle, etc. As shown, the vehicle 106 includes an over-the-air (OTA) updater device 108, one or more updatable components 110, and a download data store 214. Though not illustrated, the components of the vehicle 106 communicate with each other in some embodiments using a vehicle communication bus. Any suitable vehicle communication bus, such as a controller area network (CAN) bus, may be used.

In some embodiments, the OTA updater device 108 performs actions for updating software within the vehicle 106. In some embodiments, the OTA updater device 108 obtains software updates. In some embodiments, the OTA updater device 108 obtains information from the communication gateway server 102 for regenerating a symmetric key for an obtained software update, regenerates the symmetric key, and uses the symmetric key to decrypt the software update. Further description of the OTA updater device 108 is provided below in association with FIG. 2B.

In some embodiments, the updatable component 110 is any non-transitory computer-readable medium within the vehicle 106 that has computer-executable instructions, data, or other software stored thereon that can be updated by the OTA updater device 108. In some embodiments, this computer-readable medium may be a part of another vehicle component, such as a firmware or other memory of an ECU. In some embodiments, this computer-readable medium may be a separate component, such as a flash memory. Though only a single updatable component 110 is illustrated in FIG. 2A for ease of discussion, in some embodiments, the vehicle 106 may have more than one updatable component 110.

In some embodiments, the download data store 214 may be used by the over-the-air updater device 108 to store software update packages that have been downloaded and are awaiting decryption. In some embodiments, the download data store 214 may be a component separate from the over-the-air updater device 108, as illustrated in FIG. 2A, and the over-the-air updater device 108 may communicate with the download data store 214 via the vehicle communication network. In some embodiments, the download data store 214 may be a subcomponent of the over-the-air updater device 108.

FIG. 2B illustrates further details regarding components within the over-the-air (OTA) updater device 108. As shown, the OTA updater device 208 includes at least one processor 220, one or more wireless network interfaces 222, one or more vehicle network interfaces 224, and a computer-readable medium 226 that stores a key management module 228 and a decryption module 230 thereon. In some embodiments, the at least one processor 220 may include one or more general-purpose CPUs, one or more special-purpose processors (including but not limited to graphics processors), or other types of processors. The at least one processor 220 executes computer-executable instructions stored on the computer-readable medium 226. In some embodiments, the one or more wireless network interfaces 222 may include, but are not limited to, wireless interfaces such as a cellular network interface, a Wi-Fi interface, and a Bluetooth interface. The one or more wireless network interfaces 222 allow the OTA updater device 108 to communicate with at least the wireless network 114 and the communication gateway server 102. In some embodiments, the one or more vehicle network interfaces 224 may include at least one network interface that connects the OTA updater device 108 to other components of the vehicle 106, including but not limited to the vehicle communication bus (CAN bus) described above, an Ethernet network, a USB network, a FireWire network, a wireless network local to the vehicle 106, or another network that connects components of the vehicle 106. The key management module 228 causes the OTA updater device 108 to perform actions for registering the OTA updater device with the communication gateway server 102 and for regenerating symmetric keys as discussed further below. The decryption module 230 causes the OTA updater device 108 to perform actions for decrypting software updates using the symmetric keys regenerated by the key management module 228 as discussed further below.

In some embodiments, the vehicle ID data store 232 may store one or more public device identifiers, private device identifiers, or other identifiers that are unique to the vehicle and may be used as pieces of information for generating symmetric keys. In some embodiments, the OTA updater device 108 may collect these identifiers from other components of the vehicle 106, such as one or more updatable components 110, and may store them in the vehicle ID data store 232 for later use in registering the OTA updater device 108 and/or regenerating symmetric keys. In some embodiments, the OTA updater device 108 may retrieve a VIN of the vehicle 106 from a computer-readable medium accessible via the vehicle communication network, and may store the VIN of the vehicle 106 in the vehicle ID data store 232 for later use in registering the OTA updater device 108 and/or regenerating symmetric keys. In some embodiments, the information stored in the vehicle ID data store 232 may be updated each time the OTA updater device 108 is restarted (or at another suitable interval). In some embodiments, such an update may be forced by implementing the vehicle ID data store 232 in a volatile computer-readable medium.

Figure 3A:
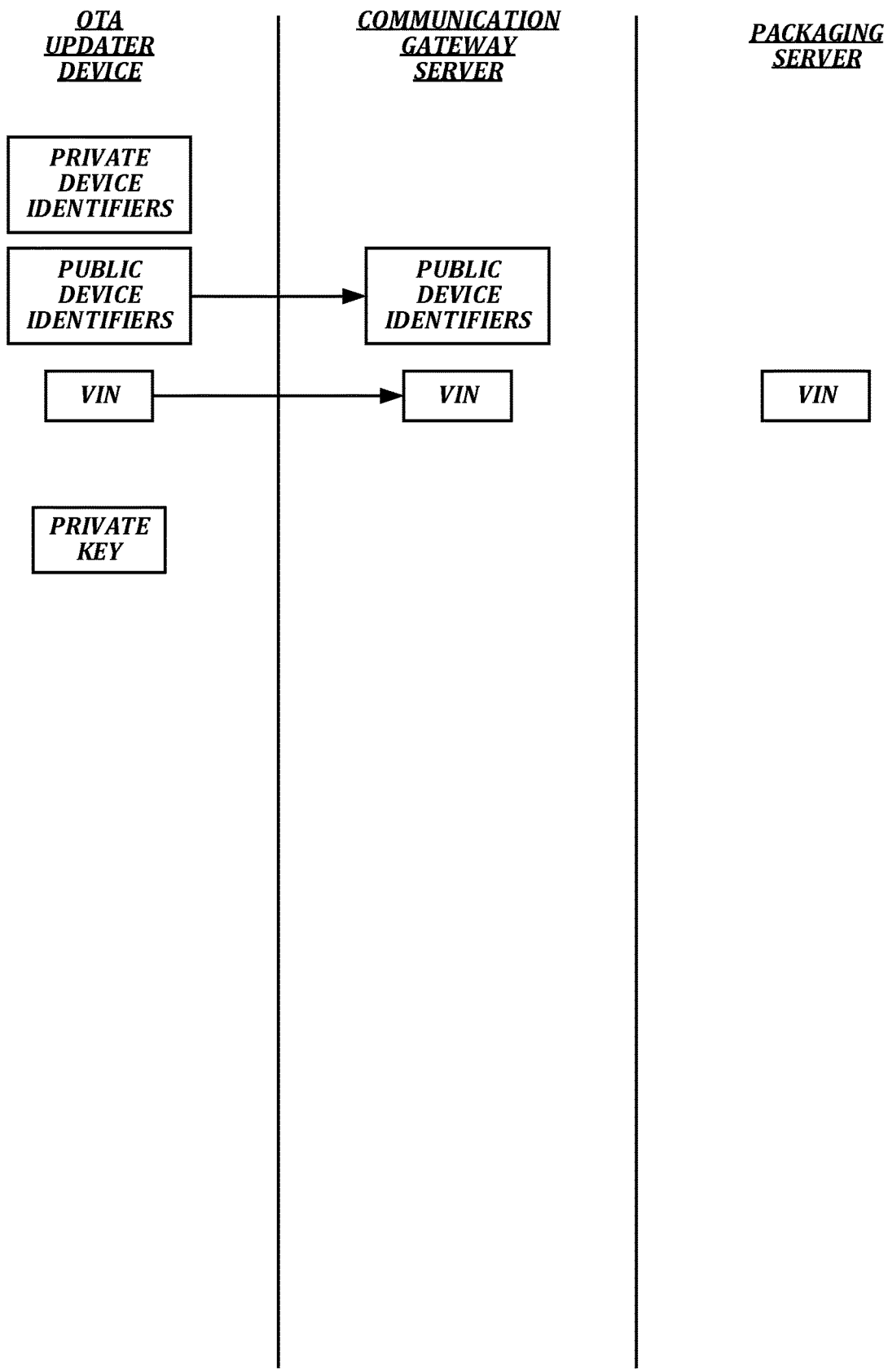
FIGS. 3A-3C are diagrams that illustrate an example of storage, creation, and transfer of information during an example method for registering an over-the-air updater device of a vehicle with a communication gateway server according to one or more aspects of the present disclosure.
Figure 3B:
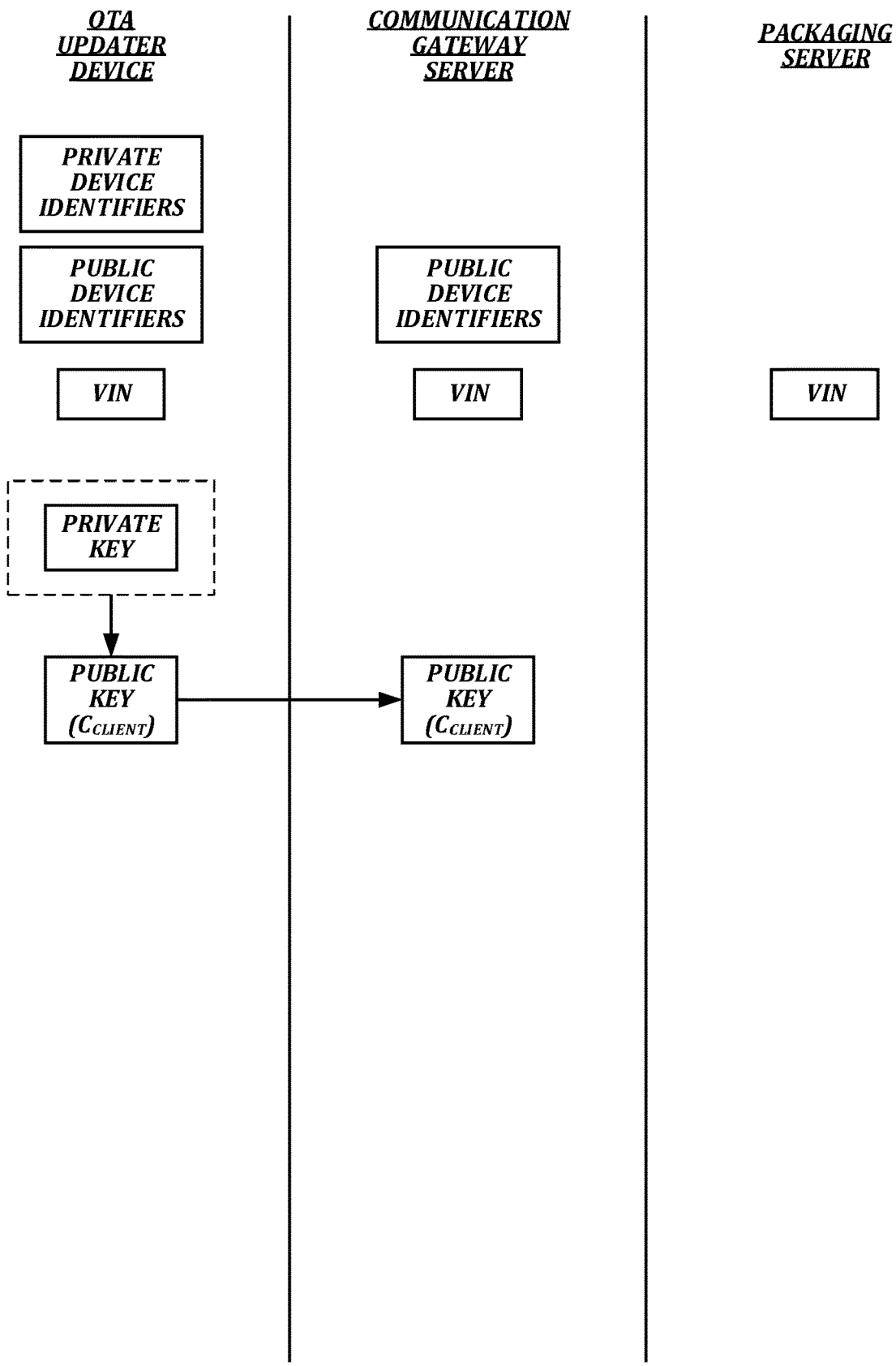
Figure 3C:
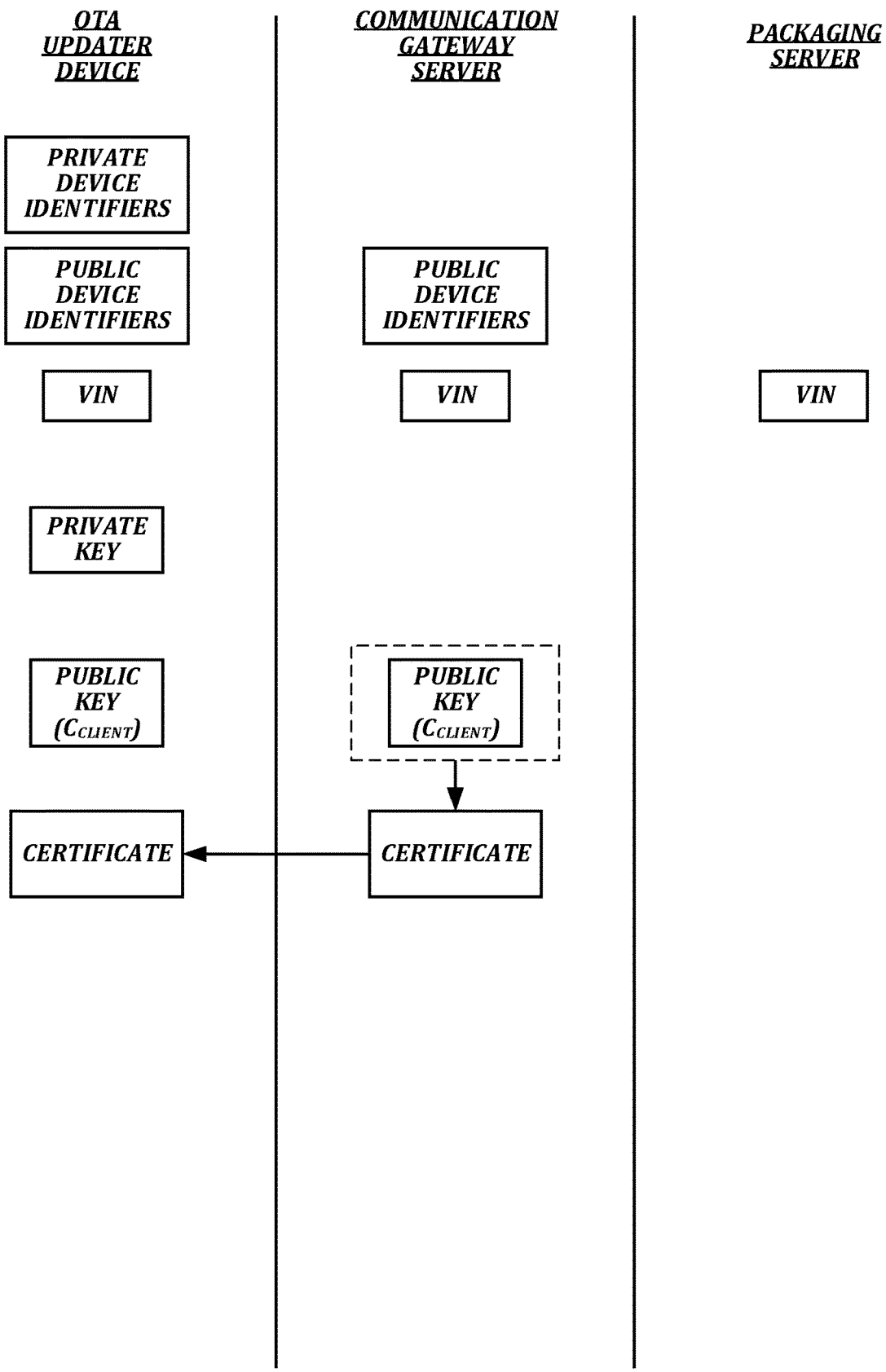

FIGS. 3A-3C are diagrams that illustrate an example of storage, creation, and transfer of information during an example method for registering an over-the-air updater device of a vehicle with a communication gateway server according to one or more aspects of the present disclosure. In FIGS. 3A-3C (as well as FIGS. 4A-4F and FIGS. 5A-5E), three vertical columns are shown. The leftmost vertical column illustrates the OTA updater device 108, the center vertical column illustrates the communication gateway server 102, and the rightmost vertical column illustrates the packaging server 104. Boxes in solid line in the diagram illustrate that one or more data elements of the specified type are present on the device associated with the column in which the box appears. Unless an explicit statement to the contrary appears in the description, if a data element is present on a device, it may be stored on the device in either a volatile computer-readable medium (including but not limited to RAM, a processor cache, or a register) or a non-volatile computer-readable medium (including but not limited to a flash memory, a ROM, an EPROM, an EEPROM, a hard disk drive, or an optical disk drive).

Boxes in dashed line in the diagram illustrate that the data elements within the dashed line box are used to generate the data element in the solid line box that is connected to the dashed line box by an arrow. An arrow from a solid line box in a first column to a solid line box in a second column indicates that the one or more data elements of the specified type are transmitted from the device associated with the first column to the device associated with the second column. Other than the dependencies introduced by virtue of a first data element being used to generate a second data element, the layout of the drawings does not imply any specific temporal dependency or order between the illustrated states.

Though multiple data elements are illustrated as being stored on the OTA updater device 108, the communication gateway server 102, and the packaging server 104, in some embodiments, one or more of these devices may have additional, unillustrated information stored thereon, as well as various computer-executable instructions for processing the information (as well as for other purposes). Further, in some embodiments, the communication gateway server 102 may store information for multiple OTA updater devices 110 and/or vehicles 106, and in some embodiments, the packaging server 104 may store information for multiple vehicles 106 and/or multiple software update packages.

As shown in FIG. 3A, the OTA updater device 108 initially stores a set of public device identifiers, a set of private device identifiers, a vehicle identification number (VIN), and a private key. In some embodiments, the set of public device identifiers includes one or more data elements that uniquely identify one or more components of the vehicle 106 and are generally known or discoverable by a user. In some embodiments, the set of public device identifiers may include one or more identifiers that can be read from a label, plate, or other location on the vehicle 106 or a component thereof, in addition to being stored on a computer-readable medium within the vehicle 106. One non-limiting example of a public device identifier is a device serial number, or DSN, which may be assigned to the OTA updater device 108, an updatable component 110, or any other device or collection of devices associated with the vehicle 106. These are considered public device identifiers because, in some embodiments, they may be determined by visual inspection of the exterior portions of the vehicle components, and so their confidentiality is minimal.

In some embodiments, the private key is any value (or set of values) suitable for use as (or for generating) a cryptographic private key. In some embodiments, the private key may include one or more random numbers (or may be used to generate one or more random numbers) of sufficient length such that it would not be feasible to derive the private key from the public keys calculated therewith. One non-limiting example of a technique for generating a private key is the RSA key generation algorithm, though other techniques may be used. In some embodiments, the private key may be generated by the OTA updater device 108 using a random or pseudorandom number generator, and may be stored by the OTA updater device 108 without ever being transmitted to another device. In some embodiments, the private key may be generated based on a password chosen by a user.

In some embodiments, the set of private device identifiers that uniquely identify one or more components of the vehicle 106 and are generally not made available to a user. In some embodiments, the set of private device identifiers may include one or more identifiers for vehicle components that can be read from a computer-readable medium associated with the components, but that cannot be otherwise determined through visible inspection of the components. Some non-limiting examples of private device identifiers include, but are not limited to, an integrated circuit card identifier (ICCID) of a subscriber identity module (SIM) used by the OTA updater device 108 to connect to a wireless network and a CPU serial number of a processor 220 of the OTA updater device 108. These are considered private device identifiers because, in some embodiments, these values may only be retrieved programmatically from the associated components, and so may not be ascertainable via visual inspection of the components as installed on the vehicle 106.

In some embodiments, the VIN uniquely identifies the vehicle 106. In addition to being displayed on the vehicle on a riveted plaque, a label, or in another way, the VIN may also be stored on a computer-readable medium of the vehicle 106 and accessible electronically by the OTA updater device 108 via a vehicle network. In some embodiments, the OTA updater device 108 may retrieve the VIN from the computer-readable medium and store it in a computer-readable medium of the OTA updater device 108. In such embodiments, OTA updater device 108 may periodically (e.g., each time the ignition bus of the vehicle 106 is turned on, each time the OTA updater device 108 boots up, after the expiration of a given time period, or at any other suitable interval) check that the VIN stored in the computer-readable medium of the OTA updater device 108 is the same as the VIN stored in the computer-readable medium of the vehicle 106, and may replace the VIN stored in the OTA updater device 108 upon detecting a mismatch. In some embodiments, the OTA updater device 108 may retrieve the VIN from the computer-readable medium of the vehicle 106 each time it is used, and store it in a volatile computer-readable medium of the OTA updater device 108.

Checking to ensure that the OTA updater device 108 stores the correct VIN associated with the vehicle 106 provides technical benefits. For example, if the OTA updater device 108 is moved to a different vehicle, the VIN stored by the OTA updater device 108 will change. By storing a different VIN, access to updates intended for the original vehicle 106 will be prevented due to the fact that the encryption key for the software update package is derived in part from the VIN, as shown below. This improves security for distribution of vehicle software updates, because a given update will only be decryptable by a specific combination of an OTA updater device 108 and a vehicle 106. This helps ensure that the given update will only be installed on the vehicle 106 intended by the packaging server 104, and even moving the OTA updater device 108 to a second vehicle would not allow the software update package to be decrypted and installed on the second vehicle.

As illustrated in FIG. 3A, the packaging server 104 may already store the VIN for the vehicle 106. In some embodiments, the packaging server 104 may be used for (or be part of a system for) managing vehicle configurations in a fleet of vehicles. Such a system may store device identifiers, software configurations, and other information for each vehicle in the fleet, and the information may be organized by an identifier such as a VIN for each vehicle. Information for each vehicle, such as the VIN, the initial software configuration, and a set of device identifiers, may be stored by the packaging server 104 when each vehicle is added to the fleet. Accordingly, the packaging server 104 would be in possession of a VIN for the vehicle 106 in the initial state.

As shown in FIG. 3A, during registration, the OTA updater device 108 transmits the public device identifiers and the VIN to the communication gateway server 102. In some embodiments, the OTA updater device 108 may retrieve the public device identifiers and the VIN from one or more computer-readable media via the vehicle communication network in order to ensure that they are accurate for the vehicle 106 in which the OTA updater device 108 is installed. In the initial state, the communication gateway server 102 does not store any of the encryption- or decryption-related information that is stored by the OTA updater device 108 or the packaging server 104, and does not initially store any specific information related to the vehicle 106. This provides additional benefits, including that the communication gateway server 102 does not require data updates each time a vehicle is added to or removed from the fleet, and therefore the data management and communication burdens are reduced. Accordingly, registration includes transmitting identifying information (such as the VIN) and other encryption- or decryption-related information (such as the public device identifiers) missing from the communication gateway server 102 in its initial state so that the communication gateway server 102 can store it for later use.

In FIG. 3B, the OTA updater device 108 uses a private key of the OTA updater device 108 to generate a public key ($C_{client}$). Determining the private key from the public key ($C_{client}$) is an intractable problem, thus protecting the secrecy of the private key if a party is in possession of the public key ($C_{client}$). Any key generation technique, including but not limited to the Digital Signature Algorithm (DSA), the Rivest-Shamir-Adleman algorithm (RSA), the Diffie-Hellman algorithm, or any other suitable technique may be used to generate the public key ($C_{client}$) based on the private key of the OTA updater device 108.

The OTA updater device 108 transmits the public key ($C_{client}$) to the communication gateway server 102. In some embodiments, the OTA updater device 108 may establish a new connection via the wireless network 114 to the communication gateway server 102 to transmit the public key ($C_{client}$). In some embodiments, the OTA updater device 108 may reuse a pre-existing wireless network connection to the communication gateway server 102, such as a connection used to transmit the public device identifiers and the VIN to the communication gateway server 102.

In FIG. 3C, the communication gateway server 102 uses the public key ($C_{client}$) to generate a certificate. The certificate can be used later by the OTA updater device 108 as a piece of evidence to prove to the communication server 102 (or another device that shares a trust root with the communication server 102) that its identity has been validated. The certificate may be generated using any suitable digital signing technique. For example, the communication gateway server 102 may store a private key, and may use the private key to encrypt the public key ($C_{client}$) along with (optionally) a set of identifying information for the OTA updater device 108. The encrypted version of the public key ($C_{client}$) and optional identifying information, along with the plaintext version of the public key ($C_{client}$) and optional identifying information, together make up the certificate. The certificate may then be checked by decrypting the certificate using a public key that corresponds to the private key of the communication gateway server 102.

After generating the certificate, the communication gateway server 102 transmits the certificate to the OTA updater device 108, which stores it for later use in establishing validated connections to the communication gateway server 102. Once the OTA updater device 108 has received and stored the certificate, it is considered registered with the communication gateway server 102, and can decrypt software updates as described, below.

FIGS. 4A-4F are diagrams that illustrate an example of storage, creation, and transfer of information during an example method for generating a symmetric key for use by a packaging server in encrypting a software update according to one or more aspects of the present disclosure. It is assumed in FIGS. 4A-4F that the OTA updater device 108 has been registered as illustrated in FIGS. 3A-3C. In FIGS. 4A-4F, the packaging server 104 has a software update to be packaged for delivery to the OTA updater device 108. The software update may include new computer-executable instructions to replace computer-executable instructions currently stored in an updatable component 110 of the vehicle 106, new settings to be stored in a computer-readable medium of the vehicle 106, a combination thereof, or any other software to be installed on a component of the vehicle 106. In some embodiments, the software update is assigned for installation on a particular vehicle 106, and is provided to the packaging server 104 by the author of the software update to be encrypted in such a way that it can only be decrypted by the assigned particular vehicle 106, and only if the assigned particular vehicle 106 is validated by the communication gateway server 102.

At a high level, the packaging server 104 requests data for generating a symmetric key from the communication gateway server 102. The communication gateway server 102 provides that data to the packaging server 104, and the packaging server 104 uses the data to generate a symmetric key. The packaging server 104 then uses the symmetric key to encrypt at least some portions of the software update package. Using the data provided by the communication gateway server 102 at the packaging server 104 to generate the symmetric key provides technical benefits, at least in that the communication gateway server 102 can control which devices receive the data, thereby improving security by limiting the devices that can regenerate the symmetric key. Having the communication gateway server 102 provide data usable to generate the symmetric key, instead of providing the symmetric key itself, provides technical benefits as well, at least in that the communication gateway server 102 cannot itself generate the symmetric key, and therefore the software update is protected from eavesdropping or other manipulation by the communication gateway server 102. Specific data and techniques for generating the symmetric key are discussed in further detail below.

Figure 4A:
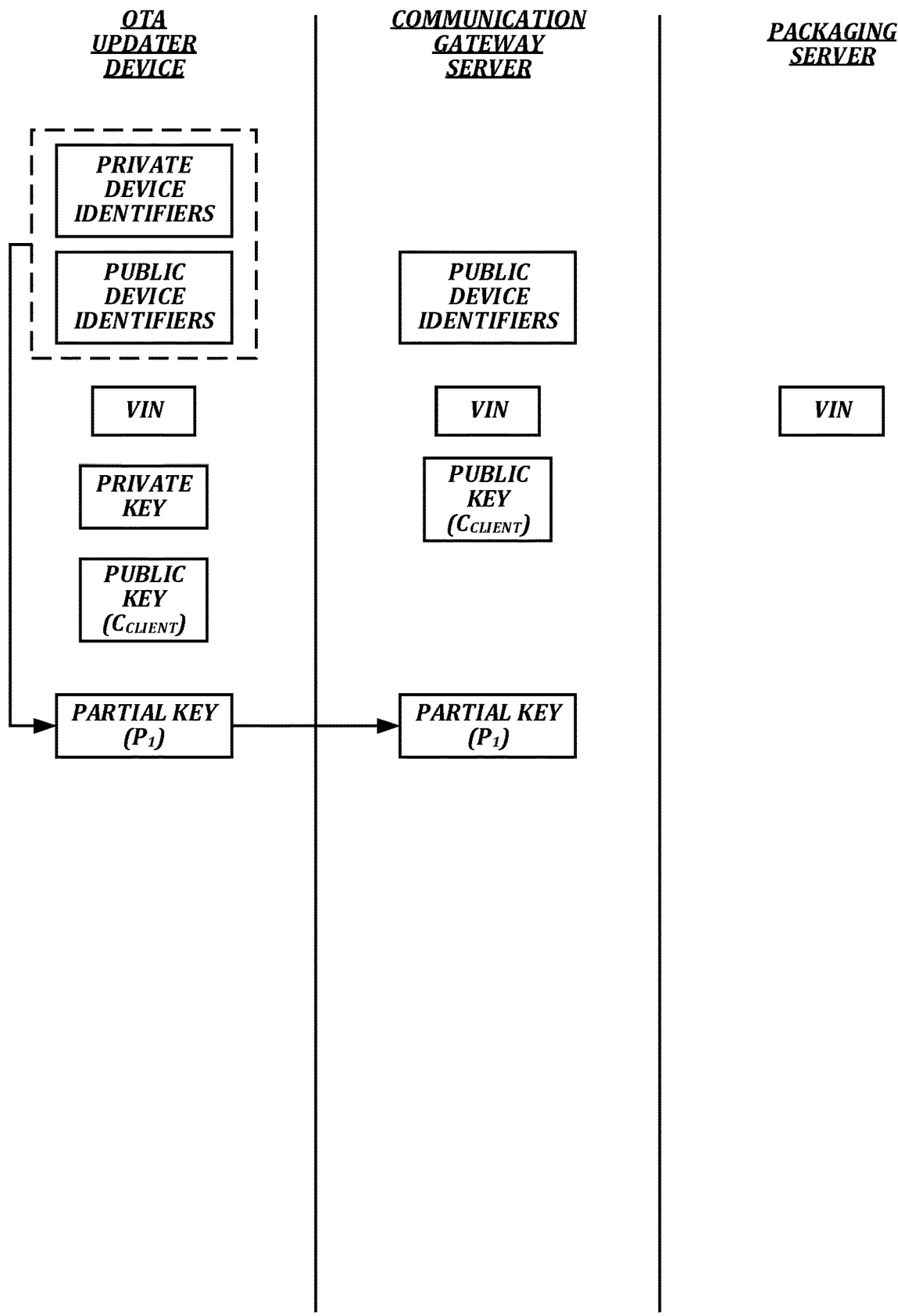
FIGS. 4A-4F are diagrams that illustrate an example of storage, creation, and transfer of information during an example method for generating a symmetric key for use by a packaging server in encrypting a software update according to one or more aspects of the present disclosure.

FIG. 4A illustrates that the OTA updater device 108 uses the private device identifiers and the public device identifiers to generate a partial key ($P_1$). Because the private device identifiers are not known by devices outside of the vehicle 106 and are included in the basis of the partial key ($P_1$), a device outside of the vehicle 106 would not be able to impersonate the OTA updater device 108 by generating the same partial key ($P_1$).

After generating the partial key ($P_1$), the OTA updater device 108 transmits the partial key ($P_1$) to the communication gateway server 102. In some embodiments, the OTA updater device 108 may transmit the partial key ($P_1$) along with the VIN to allow the communication gateway server 102 to store the partial key ($P_1$) in association with the VIN. In some embodiments, a new partial key ($P_1$) may be generated and transmitted to the communication gateway server 102 upon registration. In some embodiments, a new partial key ($P_1$) may be generated and transmitted to the communication gateway server 102 each time the OTA updater device 108 establishes a network connection to the communication gateway server 102 to check for the presence of updates (or for any other reason), which may occur at set time intervals (including but not limited to daily, weekly, or monthly), in response to actions taken within the vehicle 102 (including but not limited to upon engine startup, upon engine shutdown, upon the ignition bus being activated, or in response to actuation of a human-machine interface (HMI)), or at any other regular or irregular interval.

Any technique may be used to generate the partial key ($P_1$) based on the private device identifiers and the public device identifiers that substantially ensures a unique partial key ($P_1$) is generated for each unique combination of private device identifiers and public device identifiers, and that ensures that determining any of the private device identifiers or public device identifiers from the partial key ($P_1$) is an intractable problem. In some embodiments, a cryptographic hash function including but not limited to SHA256 may be applied to the public device identifiers to create a hash $H_1$. The hashed value $H_1$ may then be salted, and then hashed again using a function including but not limited to MD5 to create a value $A_1$. Derivations may then be performed on each of the private device identifiers, using the private device identifiers, and the values $H_1$ and $A_1$ in various combinations. For example, an RFC 2898 derivation may be performed on each of the private device identifiers, using a hash algorithm including but not limited to SHA384, and using various combinations of the private device identifiers, the $H_1$ value, and the $A_1$ value (or further hashed versions thereof) as salt and password values. The derived private device identifiers (or portions thereof) may then be combined and salted to form the partial key ($P_1$).

Figure 4B:
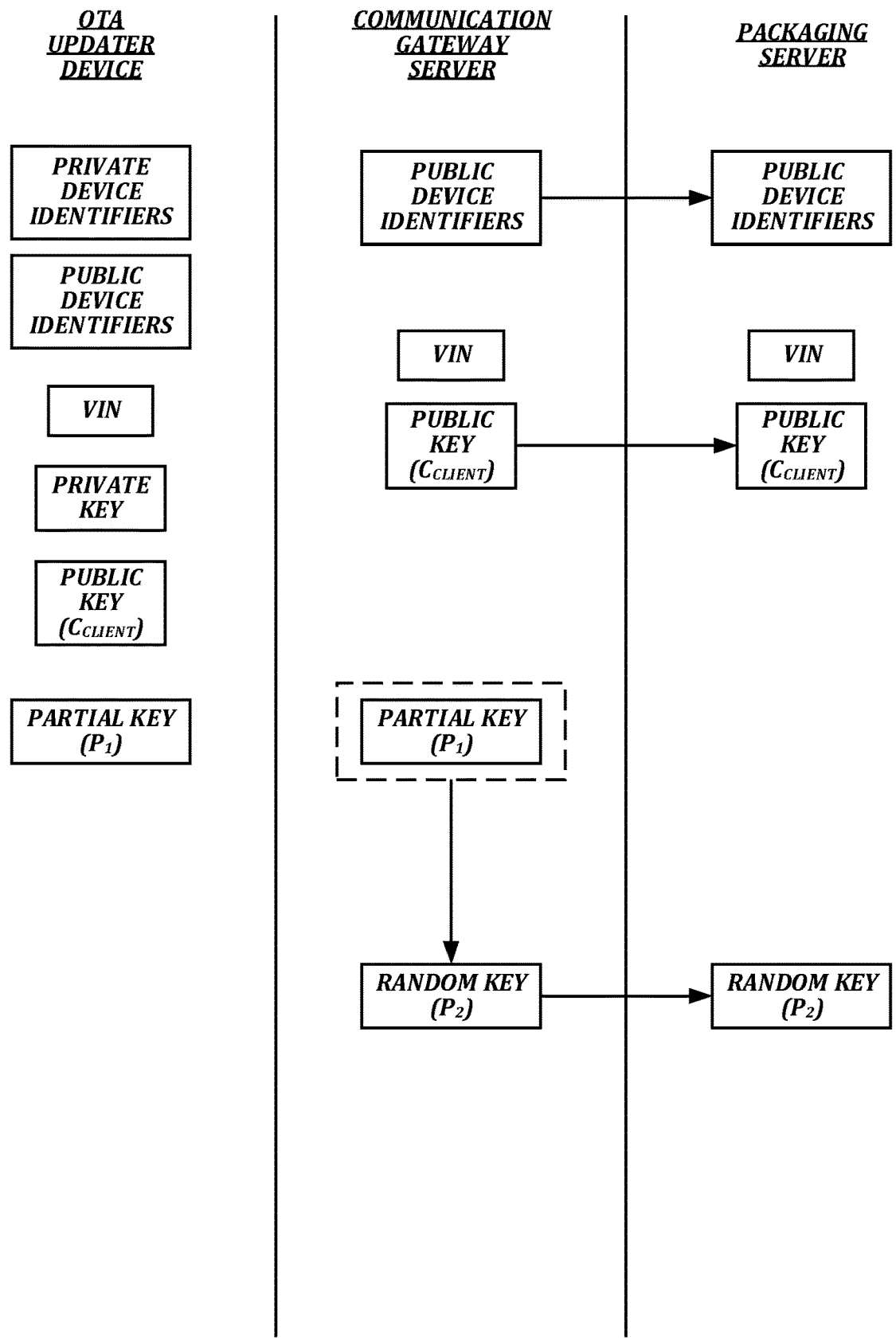

Once the communication gateway server 102 has received and stored the partial key ($P_1$), it is ready to process requests for keys from the packaging server 104. In FIG. 4B, the packaging server 104 has transmitted a request for a key to the communication gateway server 102. In some embodiments, the request from the packaging server 104 includes the VIN to identify the vehicle 106 for which the packaging server 104 is packaging a software update, and the communication gateway server 102 locates the partial key ($P_1$), the public device identifiers, and the public key ($C_{client}$) associated with the VIN. As shown, in response to the request for a key, the communication gateway server 102 uses the partial key ($P_1$) to generate a random key ($P_2$). In some embodiments, a technique is used that substantially ensures that a unique random key ($P_2$) is generated each time the packaging server 104 requests a key associated with the VIN, at least because the packaging server 104 should request a new key each time a new software package is encrypted. Further, determining the partial key ($P_1$) based on the random key ($P_2$) values that are generated should be an intractable problem. In some embodiments, a cryptographically secure pseudorandom number generator may be used, with the partial key ($P_1$) used as the seed value.

The communication gateway server 102 transmits the public device identifiers, the public key ($C_{client}$) and the random key ($P_2$) to the packaging server 104. In some embodiments, all of this information may be transmitted to the packaging server 104 together in response to a request for a random key ($P_2$). In some embodiments, the public device identifiers and/or the public key ($C_{client}$) may be transmitted to the packaging server 104 before the request for a key (or at some other time), and stored by the packaging server 104 for later use. In such embodiments, the random key ($P_2$) alone may be transmitted in response to the request for the key. In some embodiments, the packaging server 104 requests a new random key ($P_2$) to be used for each software update to be packaged in order to provide the highest possible level of protection of each package. In some embodiments, the packaging server 104 may reuse a random key ($P_2$) for more than one software update package for a given vehicle 106.

Figure 4C:
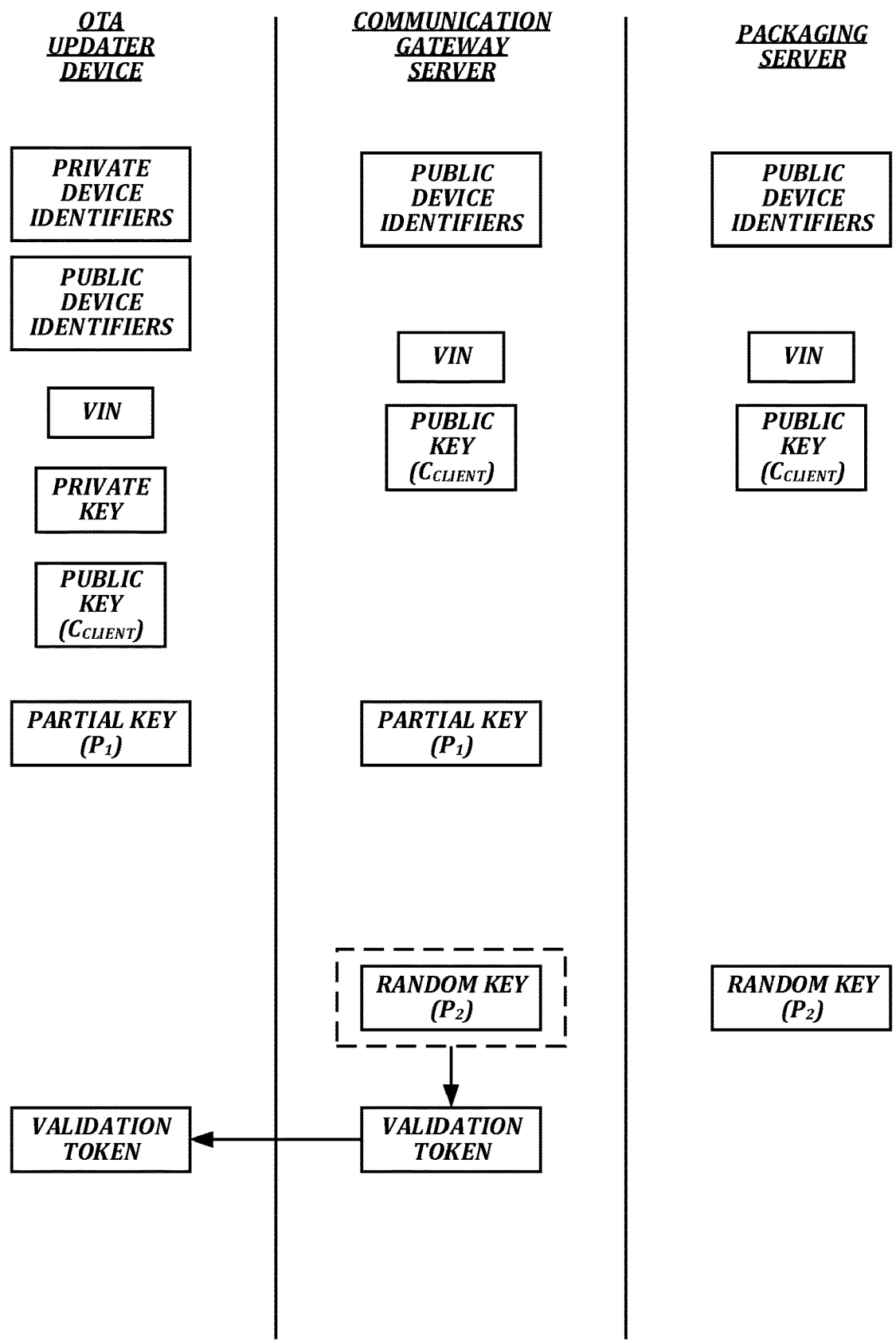

Along with being used to generate the symmetric key, the random key may also be used to help validate the OTA updater device 108. To that end, FIG. 4C illustrates the communication gateway server 102 using the random key ($P_2$) to generate a validation token. In some embodiments, the communication gateway server 102 applies a cryptographic hash function (including but not limited to SHA256 or SHA384) to the random key ($P_2$) to generate the validation token. The communication gateway server 102 transmits the validation token to the OTA updater device 108. The OTA updater device 108 can later use the validation token to prove its identity (by virtue of the fact that it has possession of the validation token) and to prove that it has received the validation token associated with the proper random key ($P_2$) (by virtue of the fact that the random key ($P_2$) stored by the communication gateway server 102 will hash to the same validation token value provided by the OTA updater device 108). These verifications help contribute to the security benefits of the system.

The communication gateway server 102 transmits the validation token to the OTA updater device 108. In some embodiments, the validation token may be transmitted to the OTA updater device 108 in response to the OTA updater device 108 establishing a network connection to the communication gateway server 102. In some embodiments, the communication gateway server 102 may push the validation token to the OTA updater device 108 using an internet-based push communication technique, including but not limited to internet-based push communication such as wireless push email, a webpush, an HTTP server push, or long polling; or a telephony-based push communication technique, including but not limited to an SMS or an application-directed SMS. In some embodiments, the validation token may be transmitted by the packaging server 104 before the software update package is encrypted and made available for download. Accordingly, the OTA updater device 108 may store the validation token for use in a later communication session with the communication gateway server 102.

Figure 4D:
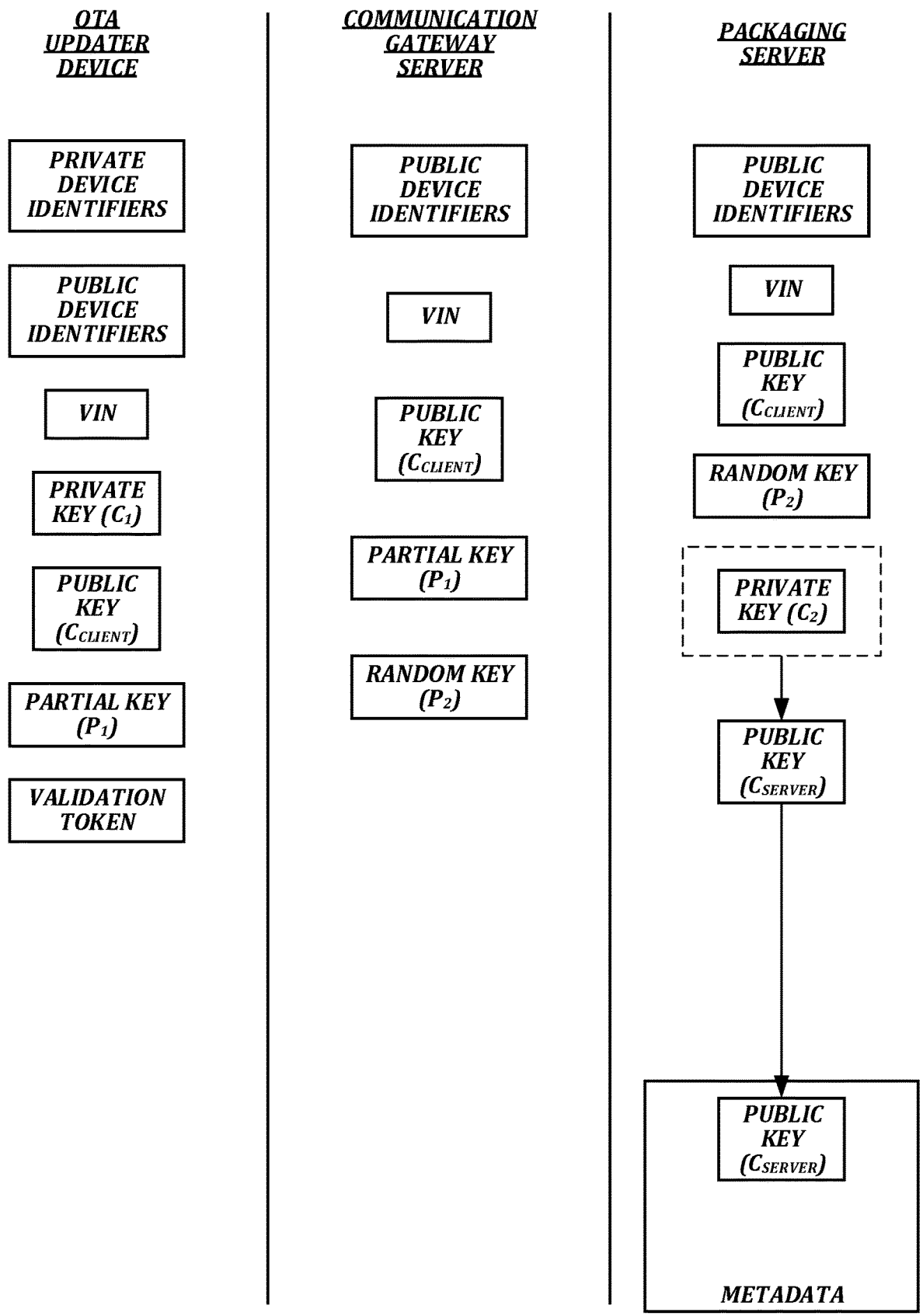

In FIG. 4D, the packaging server 104 is shown as storing a private key ($C_2$). As with the private key of the OTA updater device 108, the private key ($C_2$) is any value (or set of values) suitable for use as (or for generating) a cryptographic private key. In some embodiments, the private key may include one or more random numbers (or may be used to generate one or more random numbers) of sufficient length such that it would not be feasible to derive the private key from the public keys calculated therewith. In some embodiments, the private key may be generated by the packaging server 104 using a random or pseudorandom number generator, and may be stored by the packaging server 104 without ever being transmitted to another device. In some embodiments, the private key may be generated based on a password chosen by a user.

The packaging server 104 uses the private key ($C_2$) to generate a public key ($C_{server}$). As with the public key ($C_{client}$), determining the private key ($C_2$) from the public key ($C_{server}$) is an intractable problem, thus protecting the secrecy of the private key if a party is in possession of the public key ($C_{server}$). Any key generation technique, including but not limited to DSA, RSA, Diffie-Hellman, or any other suitable technique may be used to generate the public key ($C_{server}$) based on the private key ($C_2$).

The packaging server 104 creates a set of metadata. In some embodiments, the set of metadata is associated with the software update package. The information stored in the set of metadata may be used to identify the software update package, and may include some information that is used to reconstruct the symmetric key (as will be shown below). The packaging server 104 adds the public key ($C_{server}$) to the set of metadata. In some embodiments, the public key ($C_{server}$) is added to the set of metadata in plaintext, because the security of the encryption technique does not require the public key ($C_{server}$) to be secret, and because the public key ($C_{server}$) will be used by the OTA updater device 108 before the OTA updater device 108 has reconstructed the symmetric key for decryption purposes.

Figure 4E:
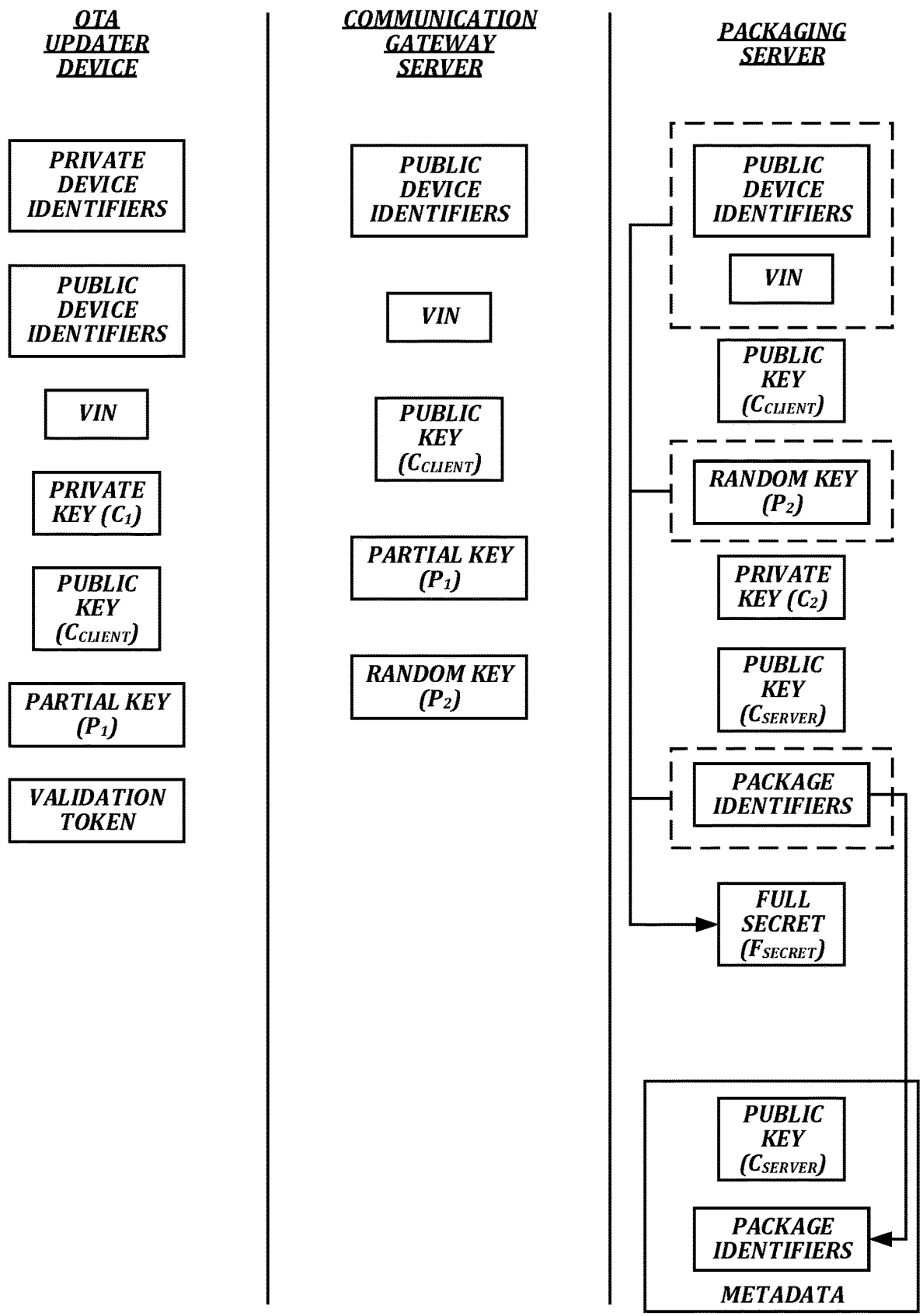

In FIG. 4E, the packaging server 104 has obtained a set of package identifiers. In some embodiments, the set of package identifiers includes one or more values that uniquely identify the software update package being created. In some embodiments, the set of package identifiers may include a globally unique identifier (GUID) generated by the packaging server 104 (or by another device and provided to the packaging server 104) to identify the software update package. In some embodiments, the set of package identifiers not only uniquely identifies the software update to be packaged, but also uniquely identifies the encryption session being used to encrypt the software update package. In other words, even if the same software update was being packaged, different sets of package identifiers would be used to identify the different software update package for each different vehicle 106.

The packaging server 104 adds the set of package identifiers to the set of metadata. In some embodiments, the set of package identifiers is added to the set of metadata in plaintext. As with the public key ($C_{server}$) the set of package identifiers may be added to the set of metadata in plaintext because the security of the encryption technique does not require the set of package identifiers to be secret, and because the set of package identifiers will be used by the OTA updater device 108 before the OTA updater device 108 has reconstructed the symmetric key for decryption purposes.

The packaging server 104 uses the public device identifiers, the VIN, the random key ($P_2$), and the package identifiers to generate a full secret ($F_{secret}$). In some embodiments, the full secret ($F_{secret}$) is generated using a cryptographic function, such that determining any of the component data that makes up the full secret ($F_{secret}$) when in possession of only the full secret ($F_{secret}$) is an intractable problem. In some embodiments, the generation of the full secret ($F_{secret}$) starts by salting and hashing the public device identifiers to create a value $A_2$. Derivations (including but not limited to RFC 2898 derivations) may be performed on each of the VIN, the public device identifiers, and the package identifiers, using various combinations of the $A_2$ value, the public device identifiers, the package identifiers, and the VIN (or hashed versions thereof) as password and salt values. The derived values may be combined, salted, and hashed in order to create the full secret ($F_{secret}$). In some embodiments, different derivations, hash functions, or values may be used to generate the full secret ($F_{secret}$).

Technical benefits such as increased security are provided by using the particular set of information described above to generate the full secret ($F_{secret}$). The security of the technique for encrypting and decrypting software update packages is increased in at least two ways: (1) the full secret ($F_{secret}$) is protected from any party that the communication gateway server 102 has not provided the random key ($P_1$), and (2) the full secret ($F_{secret}$) is inextricably tied to a given combination of VIN, public device identifiers, and package identifiers, thus ensuring that the software update package cannot be used on the wrong vehicle 106 (or if the vehicle 106 has been reconfigured since being registered). With regard to the first point, the public device identifiers, the VIN, and the package identifiers can be assumed to be public knowledge, but the random key ($P_2$) is only available to devices to which the communication gateway server 102 has provided it. Accordingly, the communication gateway server 102 can limit the devices that have access to the full secret ($F_{secret}$) by limiting access to the random key ($P_2$). Indeed, because the communication gateway server 102 does not have access to the specific steps used to generate the full secret ($F_{secret}$), and because determining the steps used to generate the full secret ($F_{secret}$) would itself be an intractable problem, the full secret ($F_{secret}$) is even protected from the communication gateway server 102. With regard to the second point, using the public device identifiers, the VIN, and the package identifiers as part of the information that generates the full secret ($F_{secret}$) will cause a different full secret ($F_{secret}$) to be generated if any of the public device identifiers, the VIN, or the package identifiers change. This inextricably ties the full secret ($F_{secret}$) to the specific combination of VIN, public device identifiers, and package identifiers, ensuring that the full secret ($F_{secret}$) can only be used for the specific software update package identified by the package identifiers and intended for the specific vehicle 106 identified by the VIN and including the devices identified by the public device identifiers.

Figure 4F:
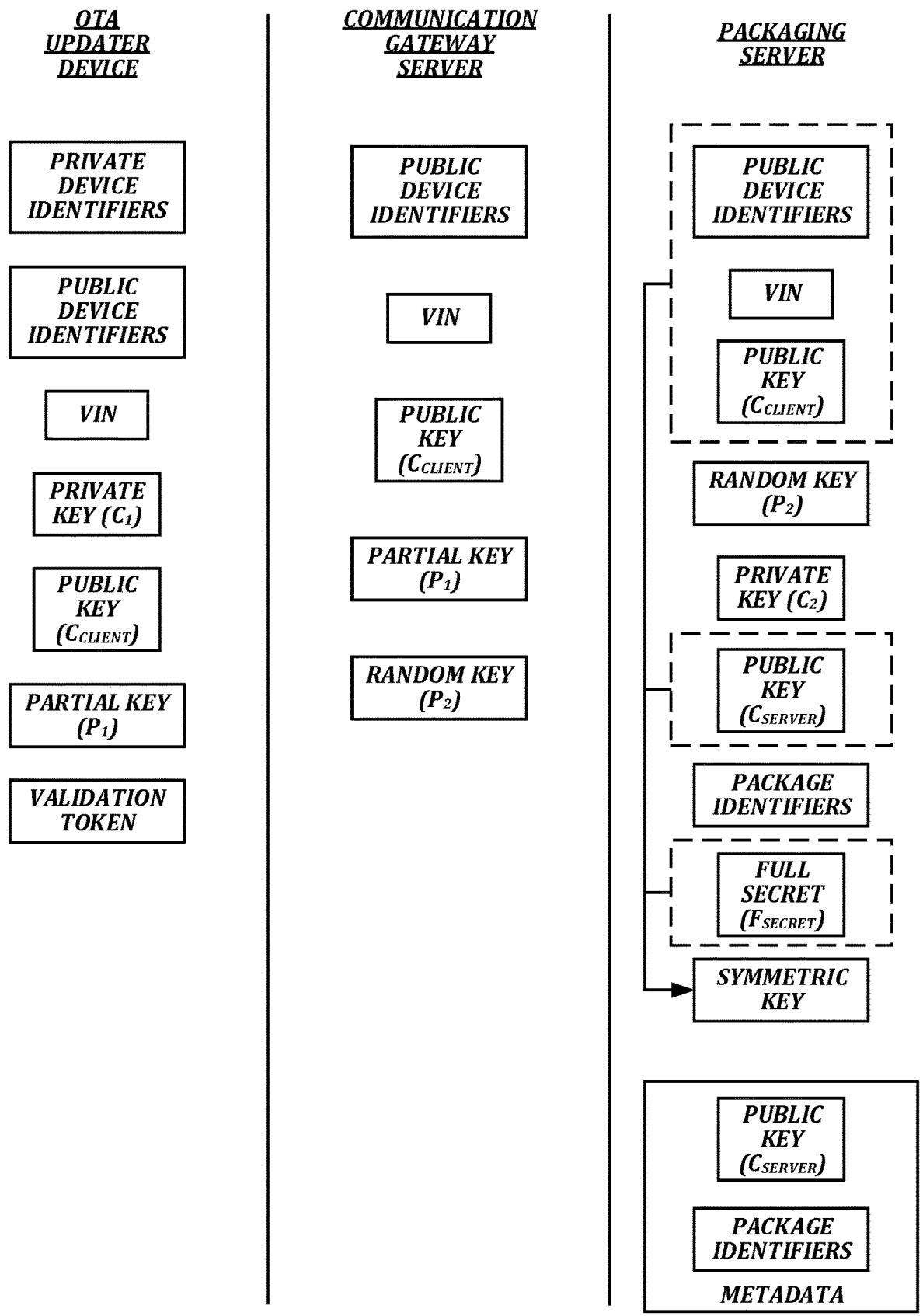

In FIG. 4F, the packaging server 104 uses the public device identifiers, the VIN, the public key ($C_{client}$), the public key ($C_{server}$), and the full secret ($F_{secret}$) to generate a symmetric key. In some embodiments, a Diffie-Hellman technique may be used to generate the symmetric key by combining the public key ($C_{client}$) and the public key ($C_{server}$), using the full secret ($F_{secret}$) as an HMAC key, and a hashed version of the public device identifiers and/or the VIN as a prepended value. In some embodiments, the full secret ($F_{secret}$) may be used to generate the symmetric key in another way. It is desirable to use Diffie-Hellman techniques to generate the symmetric key because these techniques are provably secure. The technical problem in implementing such techniques is that they use a shared secret, which must be agreed upon before deriving the symmetric key. Using the full secret ($F_{secret}$) as described herein helps address this technical problem in deploying Diffie-Hellman techniques in exchanging symmetric keys for over-the-air software updates, at least because the full secret ($F_{secret}$) does not need to be shared beforehand, but instead can be dynamically reconstructed by the OTA updater device 108 and the packaging server 102, and only by these devices when verified by the communication gateway server 104.

Once the packaging server 104 has generated the symmetric key, the packaging server 104 can use the symmetric key to encrypt the software update. Any symmetric key encryption algorithm may be used to encrypt the software update using the symmetric key, including but not limited to AES/Rijndael, Blowfish, CAST, DES, Triple DES, or IDEA. In some embodiments, the symmetric key may be used to determine the specific key used for the encryption algorithm instead of being used directly. Once the software update has been encrypted, the packaging server 104 makes the encrypted software update and the set of metadata available as a software update package. In some embodiments, the packaging server 104 may provide the software update package to the communication gateway server 102 for delivery to the OTA updater device 108 in the vehicle 106. In some embodiments, the packaging server 104 may provide the software update package to a download server other than the communication gateway server 102, for the OTA updater device 108 to download the software update package from the download server instead of the communication gateway server 102.

FIGS. 5A-5E are diagrams that illustrate an example of storage, creation, and transfer of information during an example method for generating a symmetric key for use by an over-the-air updater device in decrypting a software update according to one or more aspects of the present disclosure. In is assumed in FIGS. 5A-5E that the OTA updater device 108 has been registered as illustrated in FIGS. 3A-3C, and that the packaging server 104 has created a software update package encrypted with a symmetric key that was derived as described in FIGS. 4A-4F.

At a high level, the OTA updater device 108 receives a software update package that includes a set of metadata and an encrypted software update. The OTA updater device 108 is validated by the communication gateway server 102, and in response, the communication gateway server 102 provides partial data to the OTA updater device 108 for generating the symmetric key. The OTA updater device 108 uses information already stored by the OTA updater device 108, information from the set of metadata of the software update package, and the partial data obtained from communication gateway server 102 to regenerate the symmetric key. The OTA updater device 108 then uses the symmetric key to decrypt the encrypted software update. As discussed above, using the communication gateway server 102 to validate the OTA updater device 108 improves the security of the system by ensuring that only validated devices can obtain the information needed to reconstruct the symmetric key and decrypt the software update.

Figure 5A:
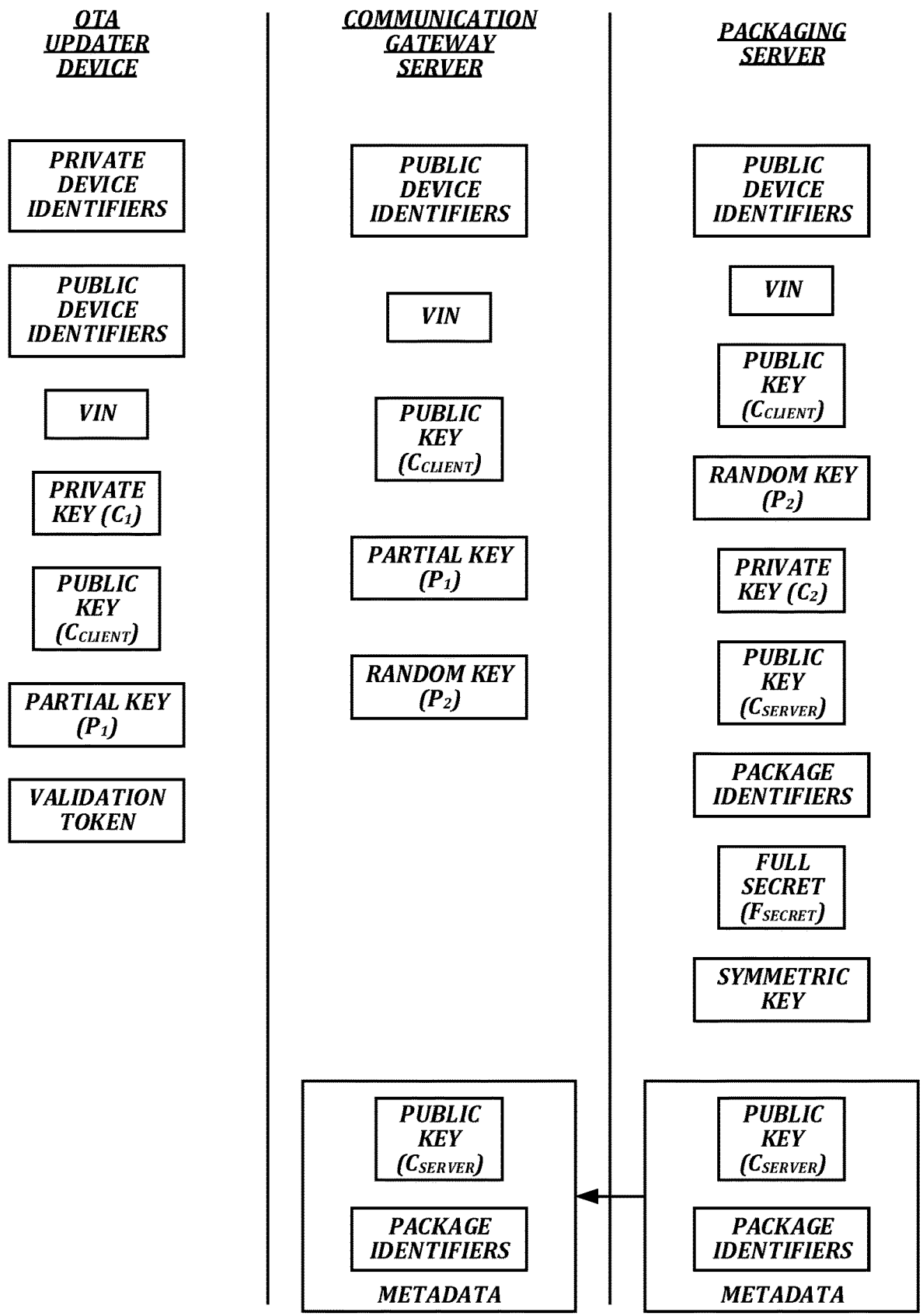
FIGS. 5A-5E are diagrams that illustrate an example of storage, creation, and transfer of information during an example method for generating a symmetric key for use by an over-the-air updater device in decrypting a software update according to one or more aspects of the present disclosure.

In FIG. 5A, the set of metadata is transmitted to the communication gateway server 102. As described above, the set of metadata includes the public key ($C_{server}$) and the set of package identifiers stored in plaintext. In some embodiments, the communication gateway server 102 stores the set of metadata in association with the VIN and/or the public device identifiers so that, when the OTA updater device 108 identifies itself to the communication gateway server 102 using one or more of the VIN and/or the public device identifiers, the proper set of metadata can be referenced. Because the random key ($P_2$) will have to be retrieved from the communication gateway server 102 in order to reconstruct the symmetric key to decrypt the software update, it is not necessarily important to the security of the procedure exactly how the OTA updater device 108 obtains the set of metadata. Accordingly, in some embodiments, the set of metadata may be transmitted to a server other than the communication gateway server 102, and the set of metadata may be retrieved by the OTA updater device 108 from the other server instead of the communication gateway server 102.

Figure 5B:
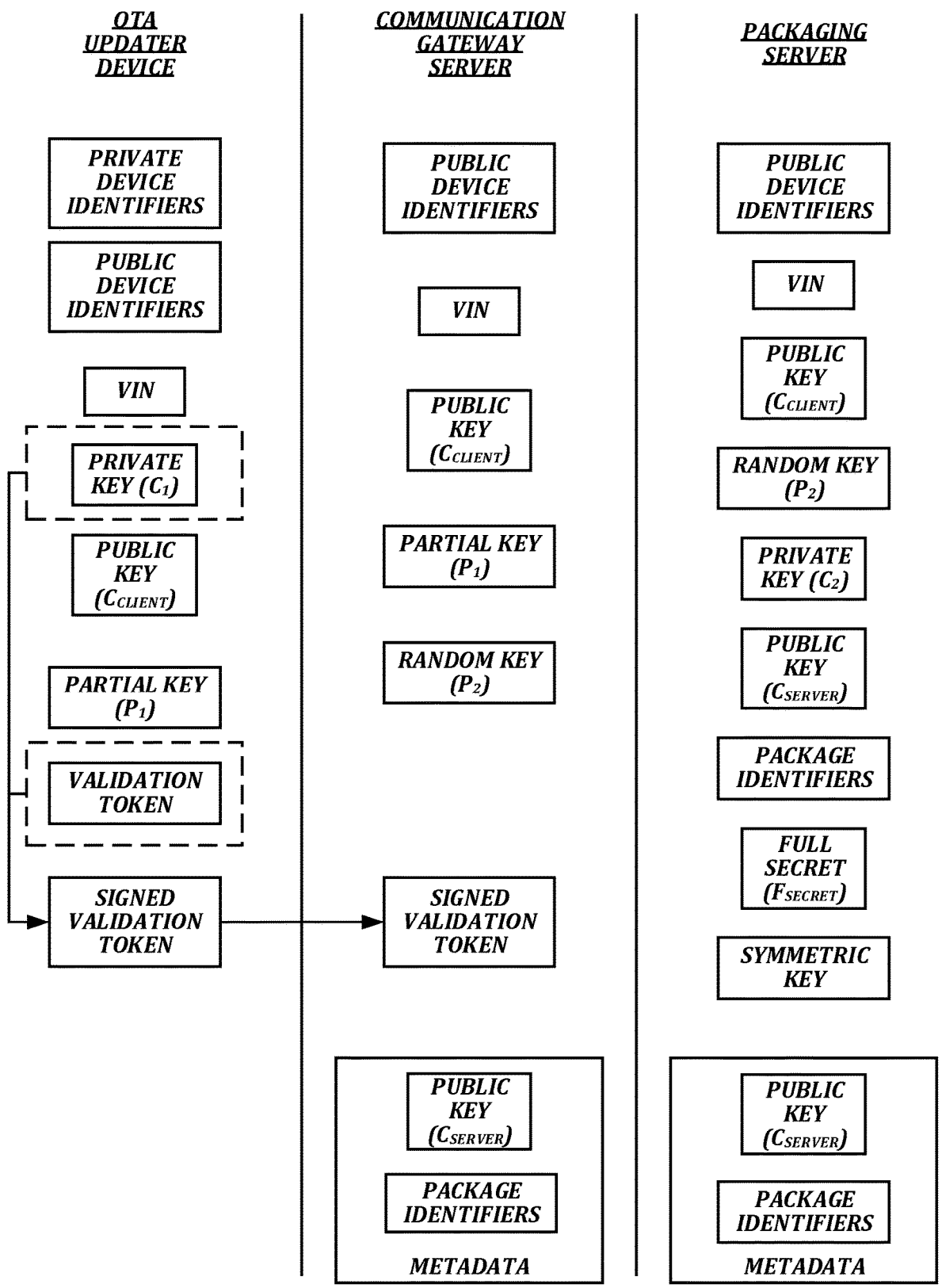

In FIG. 5B, the OTA updater device 110 has been notified that a software update package is available. This notification may take place in any suitable manner. For example, the OTA updater device 110 may establish network connections to the communication gateway server 102 at regular or irregular intervals, and upon establishment of the network connection, the communication gateway server 102 may transmit the notification to the OTA updater device 110. As another example, the communication gateway server 102 may transmit a push notification to the OTA updater device 110 that includes the notification. In some embodiments, the OTA updater device 110 may receive the notification from a server other than the communication gateway server 102.

As shown in FIG. 5B, the OTA updater device 110 uses the private key ($C_1$) and the previously received validation token to generate a signed validation token. In some embodiments, the OTA updater device 110 may use a cryptographic signing technique such as RSA-PSS, DSA, ECDSA, or any other cryptographic signing technique to generate a signed validation token using the private key ($C_1$) and the validation token. The OTA updater device 108 transmits the signed validation token to the communication gateway server 102 in order to request the random key ($P_2$). In some embodiments, the OTA updater device 108 may transmit the signed validation token to the communication gateway server 102 as part of the same network communication session during which the communication gateway server 102 transmitted the notification to the OTA updater device 108 that a software update package is available. In some embodiments, the OTA updater device 108 may initiate a new network connection to the communication gateway server 102 in order to transmit the signed validation token and request the random key ($P_2$).

The communication gateway server 102 validates the signed validation token, using the public key ($C_{client}$) that was received and stored by the communication gateway server 102 during registration. The particular technique used to validate the signed validation token using the public key ($C_{client}$) is a counterpart to the technique used to create the signed validation token using the private key ($C_1$). In addition to verifying the signature, the communication gateway server 102 may also re-compute the validation token from the stored random key ($P_2$) to ensure that the value transmitted by the OTA updater device 108 matches what was expected, thus proving that the OTA updater device 108 not only is the OTA updater device 108 that is expected, but also that the OTA updater device 108 had properly received the expected validation token.

Figure 5C:
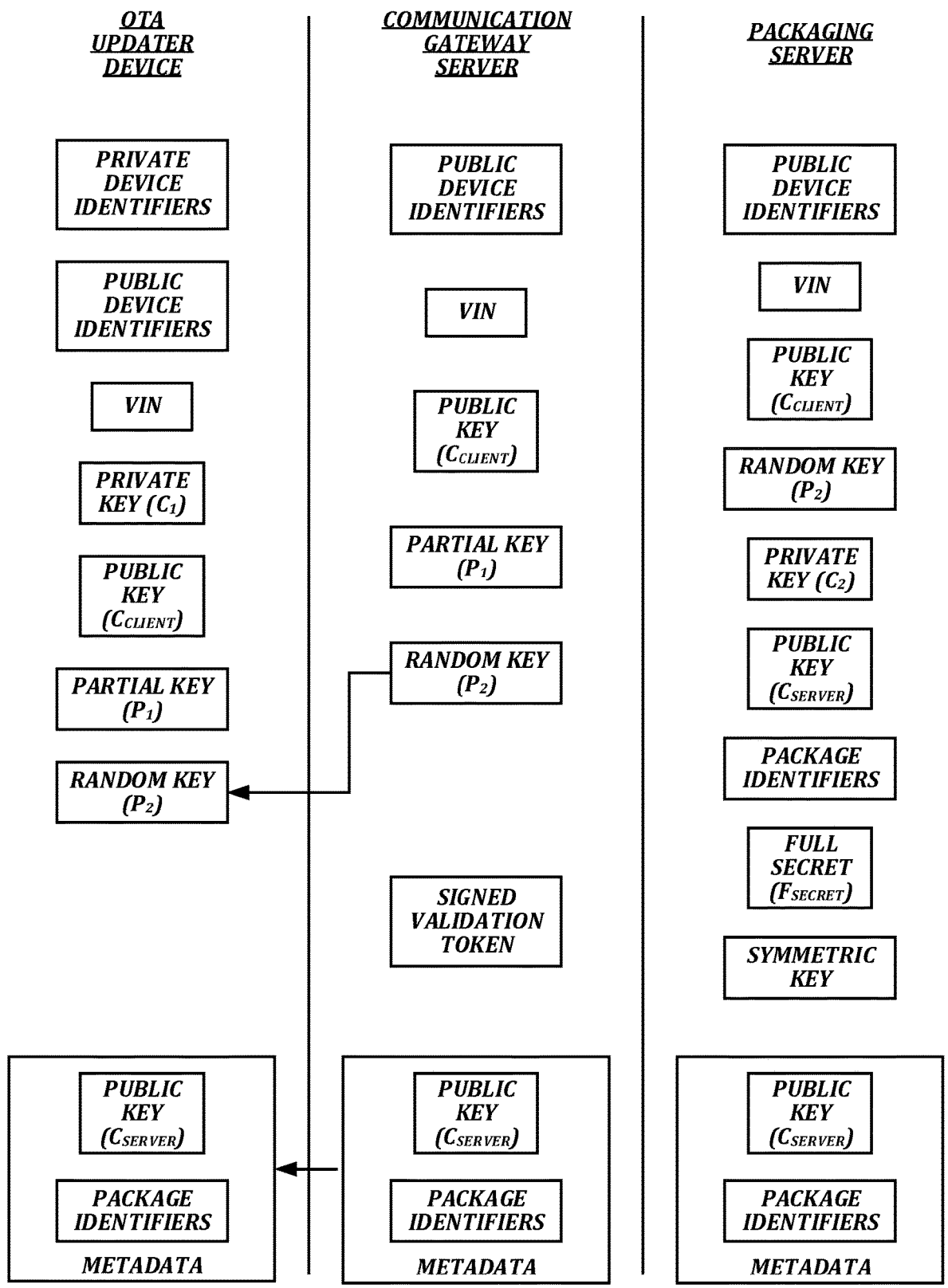

In FIG. 5C, in response to validating the signed validation token, the communication gateway server 102 transmits the random key ($P_2$) and the set of metadata to the OTA updater device 108. In some embodiments, the random key ($P_2$) could be transmitted in the same network communication session as the transmission of the signed validation token. In some embodiments, the random key ($P_2$) may be transmitted in a subsequent network communication session initiated by either the OTA updater device 108 or the communication gateway server 102. In some embodiments, the set of metadata may be transmitted along with the random key ($P_2$). In some embodiments, the set of metadata may be transmitted in a subsequent network communication session. In some embodiments, instead of transmitting the set of metadata itself, a URL or other location identifier may be transmitted to the OTA updater device 108 which the OTA updater device 108 may use to retrieve the set of metadata from another location. As mentioned above, in some embodiments, the OTA updater device 108 may have already received the set of metadata from the communication gateway server 102 or from another server, and so the set of metadata may not be transmitted again to the OTA updater device 108.

Figure 5D:
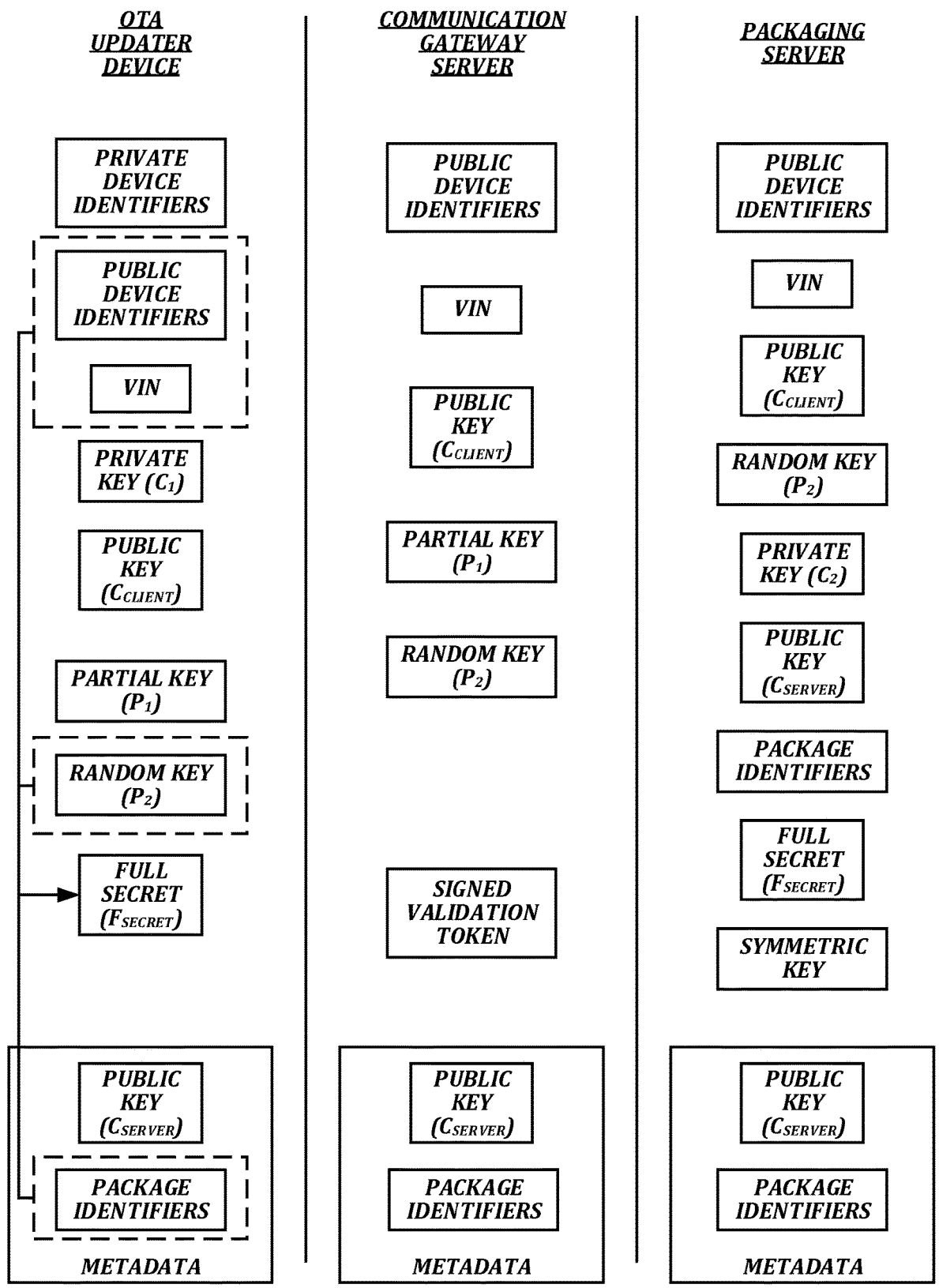

In FIG. 5D, the OTA updater device 108 uses the public device identifiers, the VIN, the random key ($P_2$), and the package identifiers to generate the full secret ($F_{secret}$) The OTA updater device 108 uses a technique to generate the full secret ($F_{secret}$) that matches the technique that was used by the packaging server 104 and was described in detail above. Because this technique matches the technique used by the packaging server 104, it is not described again here for the sake of brevity. As can be seen, the OTA updater device 108 uses the VIN and the public device identifiers at this point. However, the OTA updater device 108 has not received those values as stored by a source outside of the vehicle 106, but instead has retrieved the VIN and the public device identifiers from one or more computer-readable media within the vehicle 106 via the vehicle communication network. Accordingly, if the OTA updater device 108 is installed in a different vehicle, or one of the devices has changed and therefore has a new public device identifier, then the OTA updater device 108 will not have access to the same information used to generate the full secret ($F_{secret}$), and will be unable to recreate the same full secret ($F_{secret}$) or symmetric key used to encrypt the software update. Likewise, if the OTA updater device 108 cannot be validated by the communication gateway server 102, the communication gateway server 102 will not provide the random key ($P_2$), and the OTA updater device 108 will also not be able to generate the full secret ($F_{secret}$) or the symmetric key. This shows several aspects of how the technical benefits of increased security of the software update are achieved, in that the symmetric key cannot be generated unless the hardware configuration matches what is expected by the packaging server 104 and the communication gateway server 102 verifies that the OTA updater device 108 should receive it.

Figure 5E:
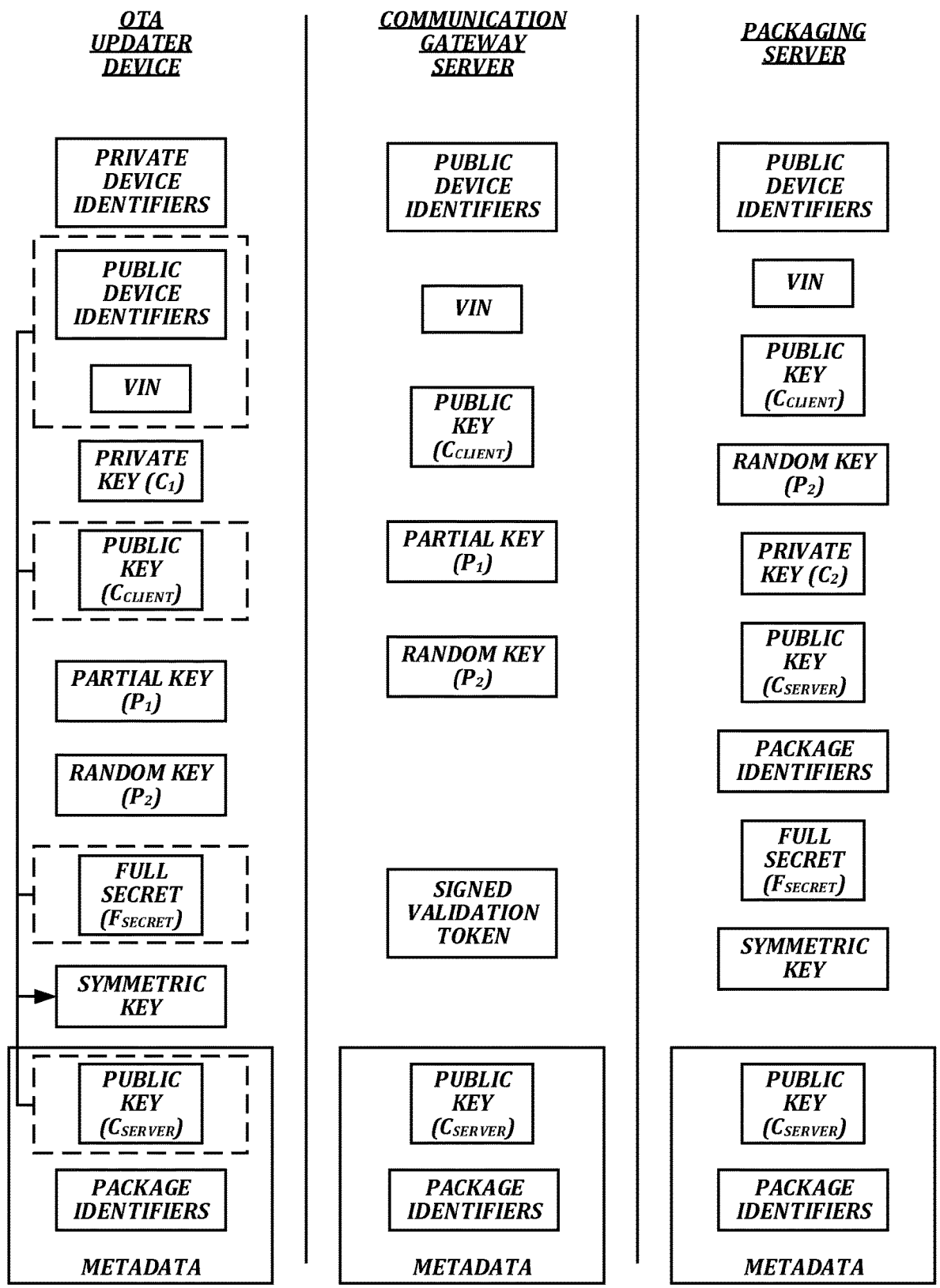

In FIG. 5E, the OTA updater device 108 uses the public device identifiers, the VIN, the public key ($C_{client}$), the full secret ($F_{secret}$), and the public key ($C_{server}$) to generate the symmetric key. Again, this technique for generating the symmetric key matches the technique used by the packaging server 104 to generate the symmetric key that was described in detail above, and is not repeated here for the sake of brevity. Though the public device identifiers, the VIN, the public key ($C_{client}$), and the public key ($C_{server}$) could be obtained by an unauthorized party, the full secret ($F_{secret}$) cannot for the reasons discussed above, and therefore helps ensure the security of the system.

The symmetric key may then be used by the OTA updater device 108 to decrypt the software update in the software update package using a technique that is complimentary to the encryption technique used by the packaging server 104. The software update package with the encrypted software update within it may be received by the OTA updater device 108 in any way. In fact, one of the technical benefits of the present disclosure is that the software update package with the encrypted software update is secured from all types of tampering, both from parties who would seek to change the contents of the software update, and from parties who would seek to install the software update on unauthorized vehicles. As such, any technique for providing the software update package with the encrypted software update to the OTA updater device 108 may be used without reducing the security of the system. For example, the OTA updater device 108 may download the software update package from the communication gateway server 102 or from a different server and store it in the download data store 214. As another example, the software update package may be copied to a removable computer-readable medium, including but not limited to an optical disc or a USB drive, and may be physically inserted into a media reader of the vehicle 106 to transfer the software update package to the download data store 214 via the vehicle communication network. Once decrypted, the OTA updater device 108 can apply the software update to one or more updatable components 110.

Figure 6:
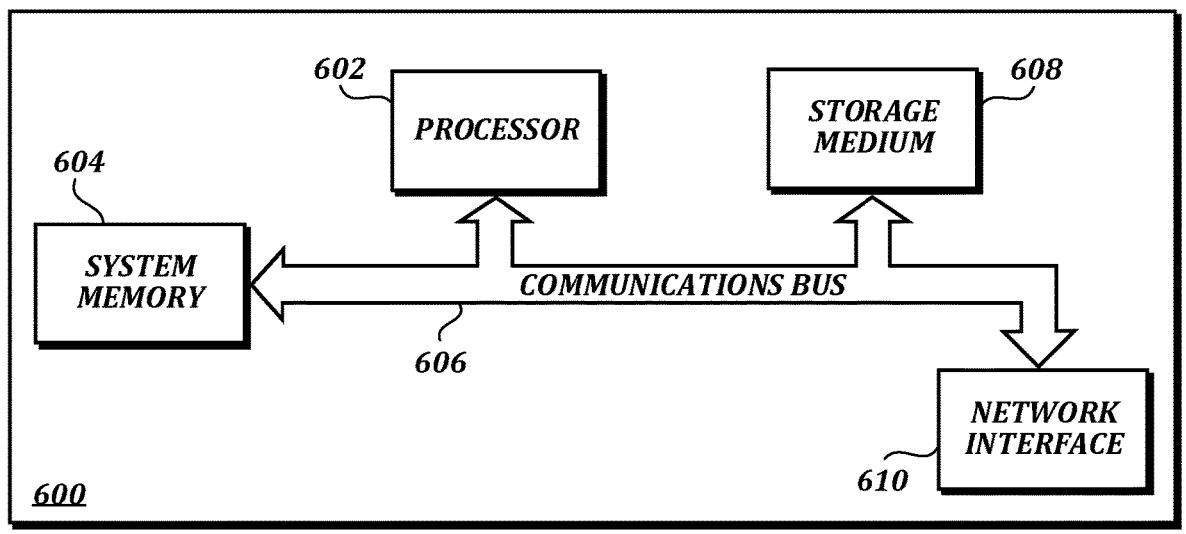
FIG. 6 is a block diagram that illustrates aspects of a representative computing device appropriate for use with embodiments of the present disclosure.

FIG. 6 is a block diagram that illustrates aspects of a representative computing device 600 appropriate for use with embodiments of the present disclosure. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as Wi-Fi, 2G, 3G, LTE, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or non-removable, implemented using any technology capable of storing information such as, but not limited to, a hard drive, solid state drive, flash memory, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 604 and storage medium 608 depicted in FIG. 6 are merely examples of computer-readable media. Computer-readable media can be used to store data for use by programs.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer-readable storage medium associated with a computing device.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiment of the invention in which an exclusive property or privilege is claimed are defined as follows:

1. A method of encrypting a software package to be delivered to an over-the-air updater device of a given vehicle, the method comprising:

retrieving, by a packaging server from a communication gateway server, information for generating a symmetric key associated with the given vehicle, the information including a random key that is generated based in part on private device identifiers associated with the given vehicle, wherein the information for generating a symmetric key includes one or more public device identifiers and a public key associated with the given vehicle and generating the symmetric key includes generating a full secret based on at least the random key, at least one of the one or more public device identifiers, and at least one package identifier determined by the packaging server;

wherein the given vehicle comprises the over-the-air updater device and at least one programmable component; and wherein the private device identifiers identify the at least one programmable component of the given vehicle;

generating, by the packaging server, the symmetric key based on the information for generating the symmetric key associated with the given vehicle retrieved from the communication gateway server;

encrypting, by the packaging server, the software package using the symmetric key; and transmitting, by the packaging server, the encrypted software package for delivery to the over-the-air updater device of the given vehicle.

2. The method of claim 1, wherein the random key is generated by the communication gateway server for the given vehicle based on a partial key and wherein the partial key is based on the private device identifiers associated with the given vehicle.

3. The method of claim 1, further comprising generating, by the packaging server, a set of metadata that includes a public key associated with the packaging server and the at least one package identifier determined by the packaging server.

4. The method of claim 1, wherein generating the symmetric key based on the information for generating the symmetric key associated with the given vehicle retrieved from the communication gateway server includes combining a public key associated with the packaging server and a public key associated with the given vehicle using a Diffie-Hellman technique, wherein the full secret is used as an HMAC key value in the Diffie-Hellman technique.

5. A vehicle, comprising:
at least one non-transitory computer-readable medium having software stored thereon; and
an over-the-air (OTA) updater device of a vehicle, comprising at least one processor and a non-transitory computer-readable medium having computer-executable instructions stored thereon that, in response to execution by the at least one processor, cause the OTA updater device to perform actions comprising:
transmitting, to a communication gateway server, a partial key that is generated based at least on private device identifiers associated with the vehicle, the partial key associated with a random key generated by the gateway server, wherein the vehicle comprises the OTA updater device and at least one programmable component, and wherein the private device identifiers identify the at least one programmable component of the vehicle;
receiving, from the communication gateway server, a validation token based on the random key generated by the communication gateway server;
receiving an encrypted software update package for updating the software stored on the at least one non-transitory computer-readable medium of the vehicle;
signing the validation token using the private key associated with the OTA updater device;
transmitting, to the communication gateway server, the signed validation token;
in response to verification of the signed validation token by the communication gateway server, receiving, from the communication gateway server, the random key, wherein the random key is associated with the encrypted software update package;
generating a symmetric key based on at least the random key, wherein information for generating the symmetric key includes one or more public device identifiers and a public key associated with the vehicle and generating the symmetric key includes generating a full secret based on at least the random key, at least one of the one or more public device identifiers, and at least one package identifier; and
decrypting the software update package using the symmetric key.

6. The vehicle of claim 5, wherein the metadata further includes a public key associated with a packaging server that encrypted the encrypted software update package; and
wherein the symmetric key is further based on the full secret, the public key associated with the packaging server, and a public key associated with the OTA updater device.

7. The vehicle of claim 5, wherein the actions further comprise registering the OTA updater device with the communication gateway server.

8. The vehicle of claim 7, wherein registering the OTA updater device with the communication gateway server includes:
transmitting a registration request to the communication gateway server, wherein the registration request includes a public key generated by the OTA updater device using the private key associated with the OTA updater device.

9. The vehicle of claim 8, wherein registering the OTA updater device with the communication gateway server further includes receiving a registration certificate from the communication gateway server.

* * * * *